US005644469A

United States Patent [19]
Shioya et al.

[11] Patent Number: 5,644,469
[45] Date of Patent: Jul. 1, 1997

[54] INFORMATION PROCESSING APPARATUS SUPPORT SYSTEM WITH SUPPORT ARMS WHICH ARE CAPABLE OF CLOSING TOWARD A KEYBOARD UNIT OR AWAY FROM A KEYBOARD UNIT

[75] Inventors: Yasushi Shioya, Kawasaki; Yasutoshi Sugita, Tokyo; Kiyoharu Yoshioka, Yokohama; Yoshiaki Nakashima, Kawasaki, all of Japan

[73] Assignee: Canon Kabushiki Kaisha, Tokyo, Japan

[21] Appl. No.: 271,589

[22] Filed: Jul. 7, 1994

Related U.S. Application Data

[63] Continuation of Ser. No. 847,671, Mar. 4, 1992, abandoned.

[30]     Foreign Application Priority Data

| Mar. 6, 1991 | [JP] | Japan | 3-065651 |
| May 9, 1991 | [JP] | Japan | 3-133433 |
| May 9, 1991 | [JP] | Japan | 3-133434 |
| May 9, 1991 | [JP] | Japan | 3-133435 |

[51] Int. Cl.⁶ ............................ G06F 1/16; H05K 7/16
[52] U.S. Cl. ............................................... 361/681
[58] Field of Search ................... 16/324–326, 371; 74/483 K; 403/95, 96, 99; 248/284, 917–923, 284.1; 400/83, 664, 680, 682; 364/708.1; 361/679–686, 730, 752, 796

[56]              References Cited

U.S. PATENT DOCUMENTS

| 4,859,092 | 8/1989 | Makita | 400/83 |
| 5,103,376 | 4/1992 | Blonder | 361/393 |
| 5,115,374 | 5/1992 | Hongoh | 361/393 |
| 5,268,817 | 12/1993 | Miyagawa et al. | 361/679 X |

FOREIGN PATENT DOCUMENTS

| 63-39731 | 3/1988 | Japan | 361/681 |

*Primary Examiner*—Michael W. Phillips
*Attorney, Agent, or Firm*—Fitzpatrick, Cella, Harper & Scinto

[57]               ABSTRACT

A display and touch panel support system for a portable computer wherein a display and touch panel unit is connected by connecting arms to a keyboard unit in such a way that the display and touch panel may be moved from an open position to one of two closed positions over the keyboard unit with either the display and touch panel facing outwardly or facing toward the keyboard unit.

13 Claims, 37 Drawing Sheets

F I G. 1
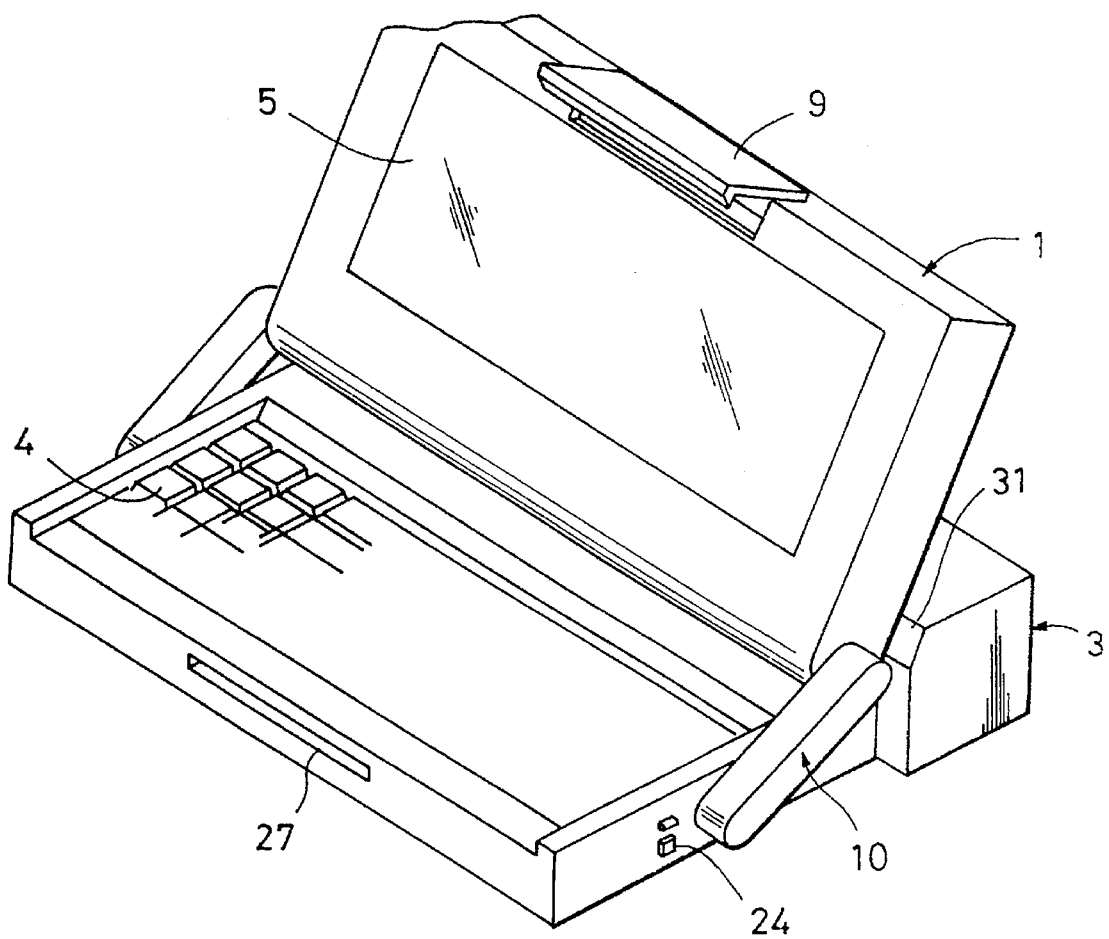

INFORMATION PROCESSING APPARATUS SUPPORT SYSTEM WITH SUPPORT ARMS WHICH ARE CAPABLE OF CLOSING TOWARD A KEYBOARD UNIT OR AWAY FROM A KEYBOARD UNIT

This application is a continuation of application Ser. No. 07/847,671 filed Mar. 4, 1992, now abandoned.

BACKGROUND OF THE INVENTION

1. Field of the Invention

This invention relates to an information processing apparatus which includes a display unit supporting means for holding an information display unit which displays information.

2. Description of the Prior Art

Information processing apparatuses having the above-described function are classified into various types, such as computers, word processors, image processing apparatuses and the like. Particularly in portable image processing apparatuses having the above-described function, in many cases a display unit supporting means for holding an information display unit is integrally connected to the main body of the display unit is integrally connected to the main body of the apparatus including an input means, such as a keyboard or the like, so as to be foldably accomodated, in consideration of convenience while being carried. In such a foldable type, the display unit supporting means is connected to the main body of the apparatus by a mounting mechanism which can hold the display unit supporting means at an opened position so as to be easily seen while being used.

FIG. 16 is a perspective view illustrating a conventional mechanism of mounting for a display unit supporting means with respect to the main body of the apparatus. The mounting mechanism shown in FIG. 16 utilizes a tightening torque and a loosening torque of a torsion coil spring 52, and is configured so that larger damping is applied when a display unit supporting means 51 is opened than when the display unit supporting means 51 is closed. If an information display unit (display surface) 53 reaches a predetermined position exceeding the vertical plane, further opening is prevented by a stopper or the like provided at a main body 54 of the apparatus. The display unit supporting means 51 supports the information display unit 53, and is rotatably (openably and closably) connected to the main body 54 of the apparatus by the mounting mechanism. A keyboard 57, serving as an input means, is provided in the main body 54 of the apparatus.

According to the provides of such portable personal computers and word processors, the range of users has widened. In personal computers (hereinafter termed PCs) and the like, however, the operation of inputting commands from a keyboard is complicated, and it is necessary to memorize a large number of commands. Such a fact hinders the use of PCs and the like. Accordingly, in order to widen the range of users, it is necessary to remove difficult processing as much as possible. For that purpose, many newer PCs have adapted an operational environment which uses icons (illustrations). In such operational environment, when an apparatus performs certain processing, an operation of selecting an icon on a display surface is performed in place of inputting symbols or characters using a keyboard or the like.

In the above-described operational environment which uses icons, a mouse or a touch panel is used as a user interface. The touch panel indicates an input means which is mounted on the front surface of the information display surface (the information display unit 53 shown in FIG. 16), and receives predetermined information by detecting coordinates of a portion of the surface depressed by a finger, a pen or the like. Although optical types combining light-emitting devices and photosensors provided around a display surface, membrane types which use a transparent conductive film, pressure types which use a pressure sensor, and the like are adopted for the touch panel, pressure types are typical.

FIG. 17 is a schematic perspective view illustrating the principle of the above-described pressure-type touch panel. In FIG. 17, pressure sensors 55 are mounted at four surrounding points on a glass plate superposed on a display surface of an information display means. Partial pressure of the pressing force when a touch panel 56 formed on the surface of the glass plate is pressed is measured, and the coordinates of the pressed portion are calculated based on the measured value.

If a mouse is used when realizing operational environment which uses icons (illustrations) in a portable PC, it is necessary to always carry the mouse in order to use an apparatus (information processing apparatus). Accordingly, this approach has the disadvantage that it is necessary to provide an area sufficient for operating the mouse.

In work stations represented by PCs, word processors and the like, a keyboard is used as a means for inputting data and commands, and a display is used as a means for displaying storage of input data and the presence/absence of commands. Other input means for assisting the above-described keyboard are also available. Mouses and touch panels are typical.

The above-described touch panel is disposed on the surface of the above-described display, and can perform an input operation by directly accessing an image displayed on the display by a finger, a pen or the like. Hence, the touch panel has attracted notice since it is more humanlike than the mouse. Particularly in a retrieval operation wherein a desired switch is selected from among a large number of switches displayed on the picture surface, utilization effect of the touch panel is large, and various kinds of software for such an operation have been developed. In addition, work stations mainly using touch panel operations, wherein a keyboard is used for data input, and a dedicated touch panel is used for retrieving and extracting operations, have appeared.

In accordance with the reduction of the size of work stations, a flat display and a keyboard occupy the entire space of a work station. As a result, apparatuses, wherein a display is rotatably (openably and closably) mounted around a rotation fulcrum disposed in the vicinity of a keyboard, have appeared. FIG. 50 is a side view illustrating a conventional work station of such type. In FIG. 50, a keyboard 52 is provided at a front portion of a main body 51 of the apparatus, and a flat display 54 is rotatably mounted around a fulcrum 53 provided in the vicinity of the keyboard 52. A touch panel is in some cases provided on the display surface of the display 54.

The conventional work station shown in FIG. 50, however, has a problem to be solved such that, if the touch panel provided on the display surface of the display 54 is mainly used, the operation of the touch panel is troublesome since the keyboard 52, which is unnecessary for the operation of the touch panel, is disposed at the front side. In order to solve such a problem, a configuration may be considered wherein the display surface of the display 54 is moved from the normal side, i.e., surface A at the front side to surface B at the back side, and the display 54 is rotated in the direction of arrow C around the fulcrum 53 so that the display surface (surface B) assumes a face-up state.

According to such a configuration, when the display 54 is closed in order to use the touch panel, the keyboard 52 is hidden, and the display 54 is close to the operator's hands. Hence, the touch panel becomes easy to operate. Another advantage is that the display 54 can be used in a mostcompact state, i.e., closed state. Such a configuration, however, has a problem to be solved such that the display surface (surface B) of the display 54 cannot be seen when the keyboard 52 is used as shown in FIG. 50 (in an upright state of the display 54). In order to solve such a problem, an approach may be considered wherein the display 54 is first detached and remounted in the reverse direction when the keyboard 52 is used. In such an approach, however, the operation is complex, and a complicated mechanism is necessary.

SUMMARY OF THE INVENTION

The present invention has been made in cosideration of the above-described problems.

It is an object of the present invention to provide an information processing apparatus which can prevent deformation of display unit supporting means when a touch panel is used, improve operability and operational feeling when an input operation is performed from the touch panel, and reduce fatigue of arms during operation.

This object is accomplished by an information processing apparatus, comprising display unit supporting means for holding an information display unit for displaying information and a touch panel for inputting information, wherein a lower-end portion of the display unit supporting means and an intermediate portion of a main body of the apparatus are connected by connecting members via a rotatable connecting portion so that the display unit supporting means can be substantially horizontally placed on the main body of the apparatus with the touch panel in a faced-up state.

According to the above-described configuration, since the back surface of the display unit supporting means can be supported by the main body of the apparatus so that the information display unit assumes a substantially horizontal posture, it becomes possible to depress the touch panel from above, and thereby to remove deformation of the display unit supporting means when the touch panel is depressed. Furthermore, it becomes possible to easily move the display unit supporting means between a position for performing an input operation by depressing the touch panel and a position for performing an input operation from the keyboard while watching the information display unit. Hence, it is possible to provide an optimum environment for use.

It is another object of the present invention to provide an information processing apparatus which can securely prevent torsion of a signal transmission member, such as a cable for connecting the main body of the apparatus and an image display unit or the like, even if a display unit supporting means is rotated.

This object is accomplished by an information processing apparatus, comprising display unit supporting means for holding an information display unit for displaying information and a touch panel, serving as input means, wherein a plane substantially parallel to the touch panel is formed at a back surface of the display unit supporting means, and the display unit supporting means is detachable relative to a main body of the apparatus. This object is also accomplished by an information processing apparatus comprising display unit supporting means for holding an information display unit for displaying information, wherein one end of the display unit supporting means is rotatably connected to a main body of the apparatus, a box-like member through which a signal transmitting member passes is rotatably provided at one of the main body of the apparatus and the display unit supporting means, and a recess in which the box-like member is fitted without being detached when the display unit supporting means rotates is provided at the other one of the main body of the apparatus and the display unit supporting means.

It is an object of the present invention to provide an information processing apparatus which can prevent displacement (movement) of display unit supporting means when a touch panel is used, improve operability and operational feeling when an input operation is performed from the touch panel, and reduce fatigue of arms during operation.

This object is accomplished by an information processing apparatus, comprising display unit supporting means for holding an information display unit for displaying information and a touch panel for inputting information, wherein the display unit supporting means and a main body of the apparatus are connected by connecting members which are rotatably connected to lower end portions of the display unit supporting means and are connected to the main body of the apparatus so as to be slidable in back-and-forth directions, whereby the display unit supporting means can be substantially horizontally placed on the main body of the apparatus with the touch panel in a face-up state.

According to the above-described configuration, since the back surface of the display unit supporting means can be supported by the main body of the apparatus so that the information display unit assumes a substantially horizontal posture, it becomes possible to depress the touch panel from above, and thereby to remove deformation and displacement of the display unit supporting means when the touch panel is depressed. Furthermore, it becomes possible to easily move the display unit supporting means between a position suitable for performing an input operation by depressing the touch panel and a position suitable for performing an input operation from the keyboard while watching the information display unit. Hence, it is possible to provide an optimum environment for use.

It is still another object of the present invention to provide a work station which can provide a state such that a keyboard and a touch panel on a display can be easily simultaneously used, and a state such that a display surface can be easily seen by standing the display behind the keyboard by a simple operation.

This object is accomplished by a work station wherein a display is accomodated on an operational surface of a keyboard with a display surface of the display in a face-up state, the work station comprising a first arm for upwardly moving a front-end portion of the display above the operational surface of the keyboard, and a second arm for upwardly moving a rear-end portion of the display. According to another aspect, the work station is also configured such that the front-end portion of the display is held at a position behind the operational surface of the keyboard by further rotating the first arm, and the display is supported at an upright position by the second arm.

BRIEF DESCRIPTION OF THE DRAWINGS

FIG. 1 is a perspective view of an appearance showing a state suitable for keyboard input of an information processing apparatus according to a first embodiment of the present invention;

FIG. 37 is a cross-sectional view showing the structure of a connecting portion between the display unit supporting means and the main body of the apparatus of the connecting member along line 37—37 shown in FIG. 36;

FIG. 38 is a partial cross-sectional view showing a holding mechanism and a guide mechanism provided at the rear side for holding the connecting member relative to the main body of the apparatus, and a guide mechanism;

DETAILED DESCRIPTION OF THE PREFERRED EMBODIMENTS

First Embodiment

Figure 2:
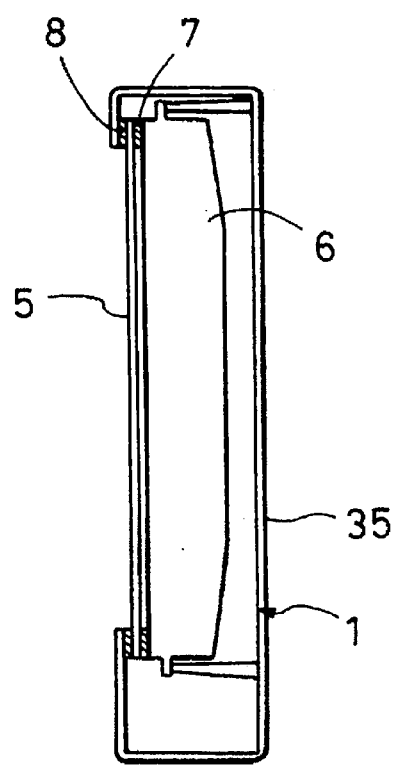
FIG. 2 is a vertical cross-sectional view showing the internal structure of a display unit supporting means shown in FIG. 1.

FIG. 1 is a perspective view of an appearance of an information processing apparatus according to a first embodiment of the present invention. In FIG. 1, a keyboard 4 for input operation is provided at an upper surface of a portion closer to the operator of the upper surface of a main body 3 of the apparatus. A display unit supporting means 1 for holding an information display unit for displaying information and a touch panel 5, serving as an input means, is rotatably connected to the main body 3 of the apparatus via connecting members 10. The touch panel 5 is incorporated on the front surface of the information display unit (display surface) in a superposed state. The keyboard 4 is disposed at a position lower than the surface of the main body 3 of the apparatus. In respective drawings illustrating the embodiment, the same numerals indicate the same components (or equivalent components).

FIG. 2 is a vertical cross-sectional view showing the internal structure of the display unit supporting means 1. In FIG. 2, a packing 7 is disposed between a display means 6, such as a liquid crystal display or the like, and the touch panel 5 so that the gap is minimized in order to prevent deviation between a display position and a touch position due to parallax, and the touch panel 5 does not contact the front surface (display surface) of the display means 6 by a pressing force. A packing 8 is also disposed between the display unit supporting means 1 and the touch panel 5 in order to prevent an erroneous operation due to a stress applied to the touch panel 5. A plane 35 substantially parallel to the touch panel 5 is formed on a surface (back surface) opposite to the display surface (the surface at the side of the touch panel 5) of the display unit supporting means 1.

Figure 3:
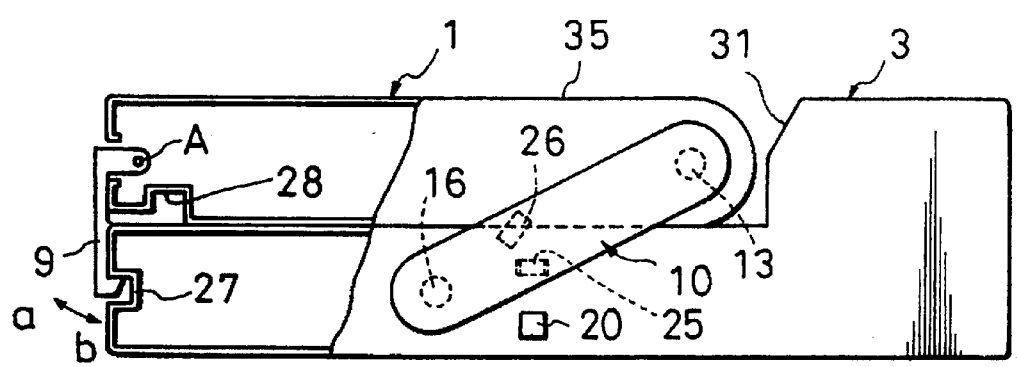
FIG. 3 is a side view showing a state wherein the display unit supporting means is closed (folded) on the information processing apparatus of the first embodiment.
Figure 4:
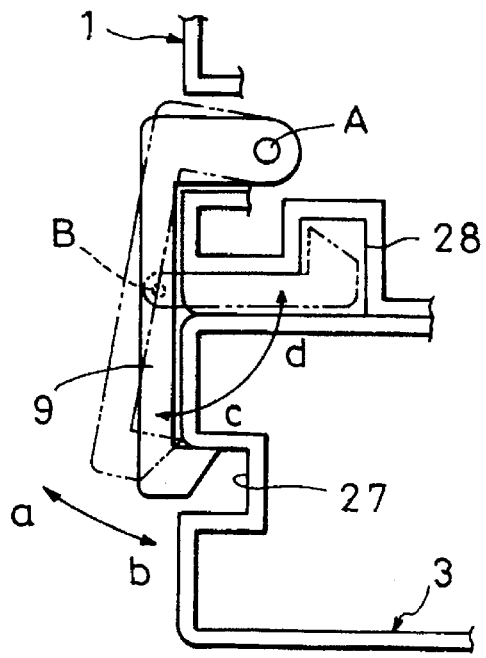
FIG. 4 is a partial vertical cross-sectional view showing the detailed structure of a hook shown in FIG. 3.
Figure 5:
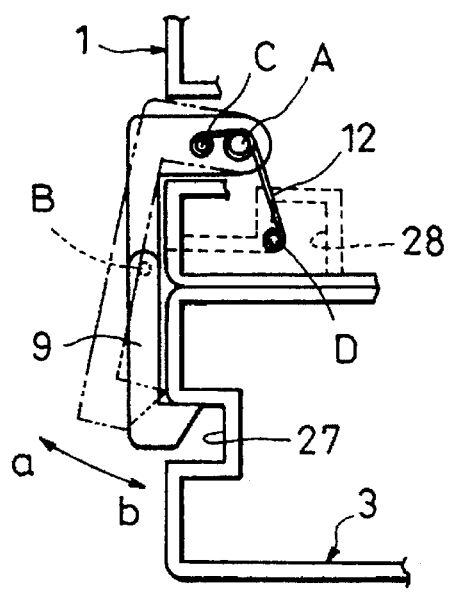
FIG. 5 is a partial vertical cross-sectional view of another position showing the detailed structure of the hook shown in FIG. 3.

FIG. 3 is a partially broken side view showing the schematic configuration of a mechanism of mounting the display unit supporting means 1 on the main body 3 of the apparatus. In FIG. 3, while the information processing apparatus is carried, the display unit supporting means 1 is held on the main body 3 of the apparatus by a hook 9 and connecting members 10. FIGS. 4 and 5 are partial vertical cross-sectional views showing the detailed structure of the hook 9. In FIG. 4 and 5, the hook 9 is rotable around a fulcrum A provided on the display unit supporting means 1 in the directions of arrows a and b, and is foldable around point B provided in an intermediate portion of the hook 9 in the directions of arrows c and d. The hook 9 is always driven in the direction of arrow b by a spring 12 both ends of which are fixed to point C on the hook 9 and point D in the display unit supporting means 1. A recess 27, engageable with the hook 9, is provided on the front side of the main body 3 of the apparatus. A recess 28 for accommodating the hook 9 is provided in the display unit supporting means 1.

Figure 6:
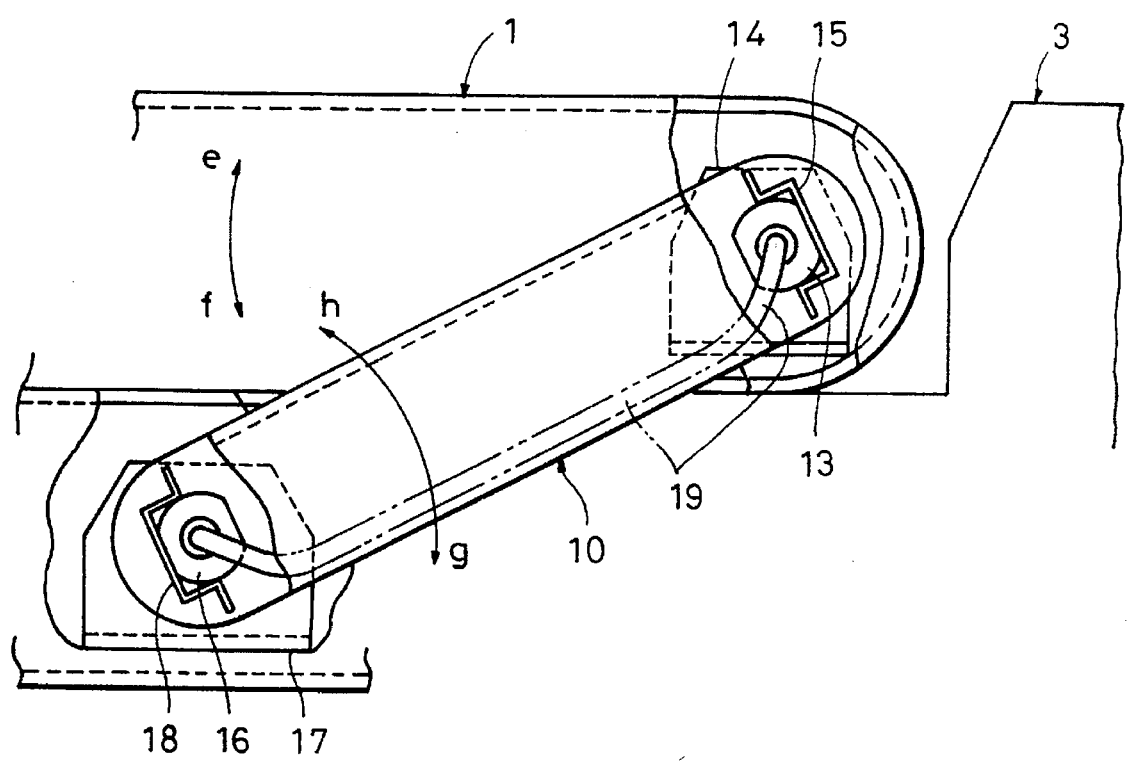
FIG. 6 is a partial side view showing the detailed structure of connecting portions of a connecting member shown in FIGS. 1 and 3.

FIG. 6 is a partial side view showing the structure of the connecting members 10. The connecting members 10 are provided at the right and left sides of the information processing apparatus. The two members have substantially the same structure. The connecting members 10 connect lower-end portions of the sides (as shown in FIG. 1, lower portions in a state of opening (standing) the display unit supporting means 1) of the display unit supporting means 1 and intermediate portions (central portions) of the sides of the main body 3 of the apparatus, and are rotatably connected to the respective portions. In FIG. 6, connecting shafts 13 for the connecting members 10 are provided at right and left lower-end portions of the display unit supporting means 1. Each of the connecting shafts 13 is supported on the display unit supporting means 1 by a supporting member 14, and is fixed within the connecting member 10 by a fixing member 15. According to such a connecting structure, the display unit supporting means 1 is rotatable relative to the connecting members 10 in the directions of arrows e and f.

Figure 16:
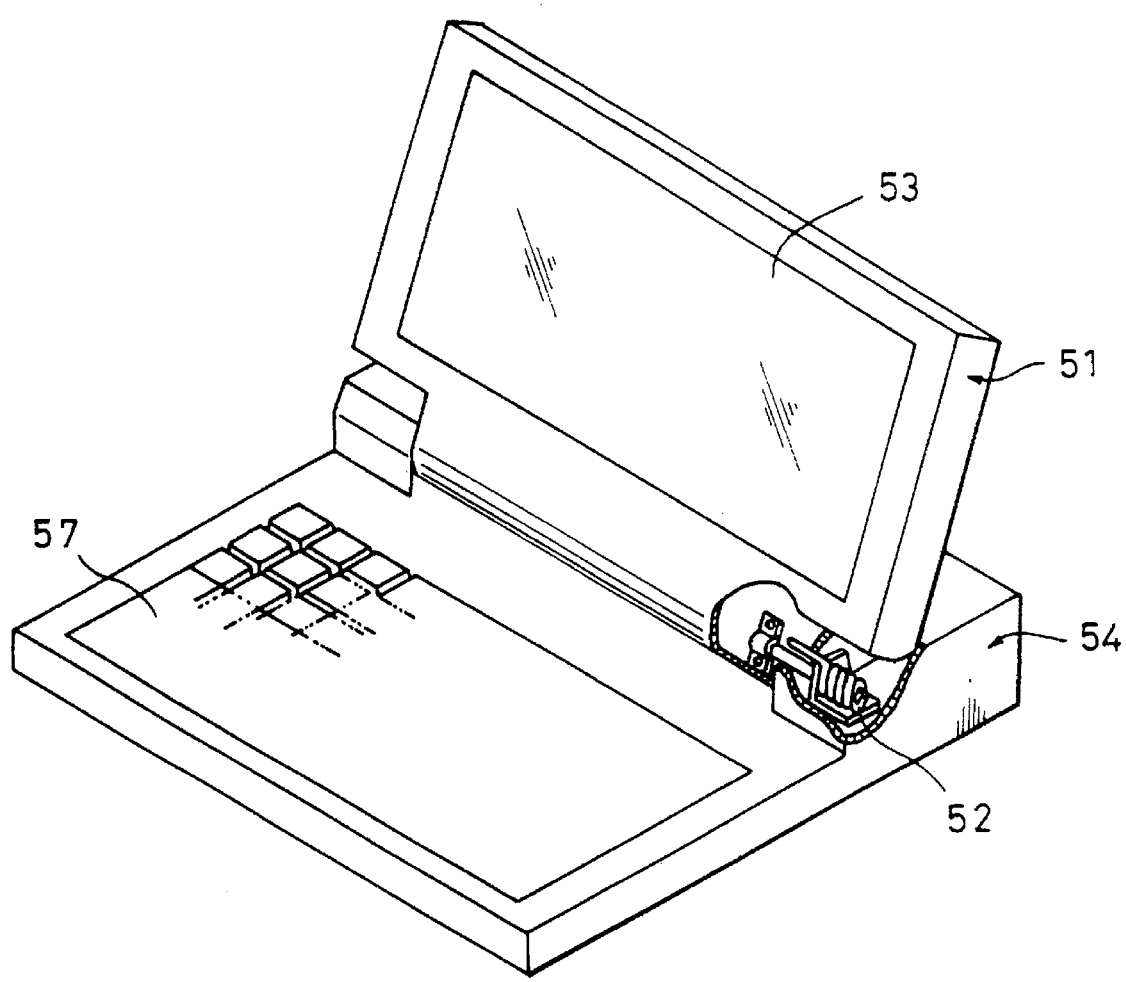
FIG. 16 is a partially broken perspective view of an appearance showing an example of the configuration of a conventional information processing apparatus.
Figure 17:
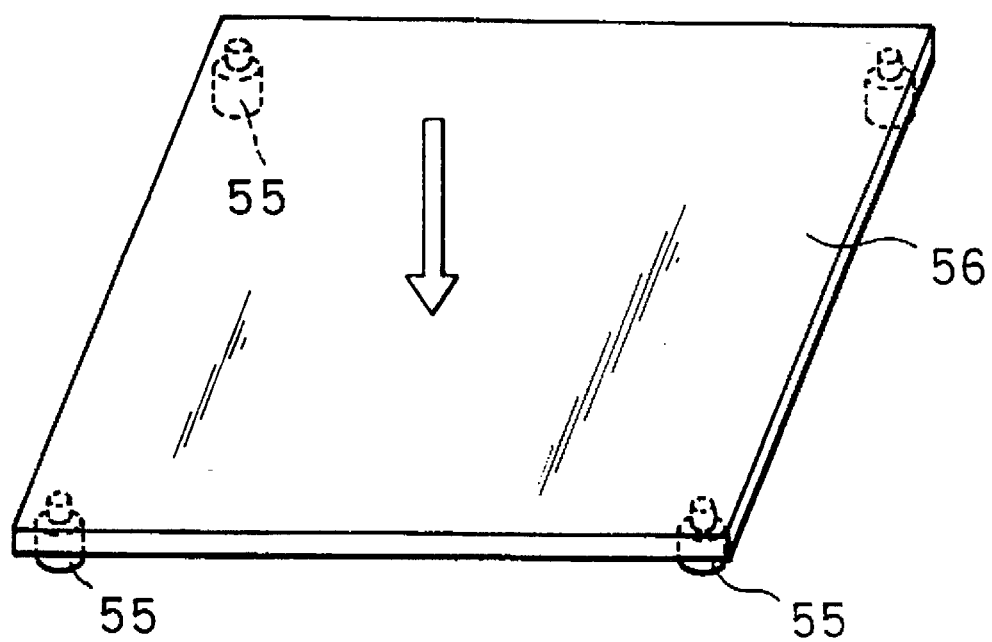
FIG. 17 is a schematic perspective view showing an example of the structure of a pressure-type touch panel.
Figure 18:
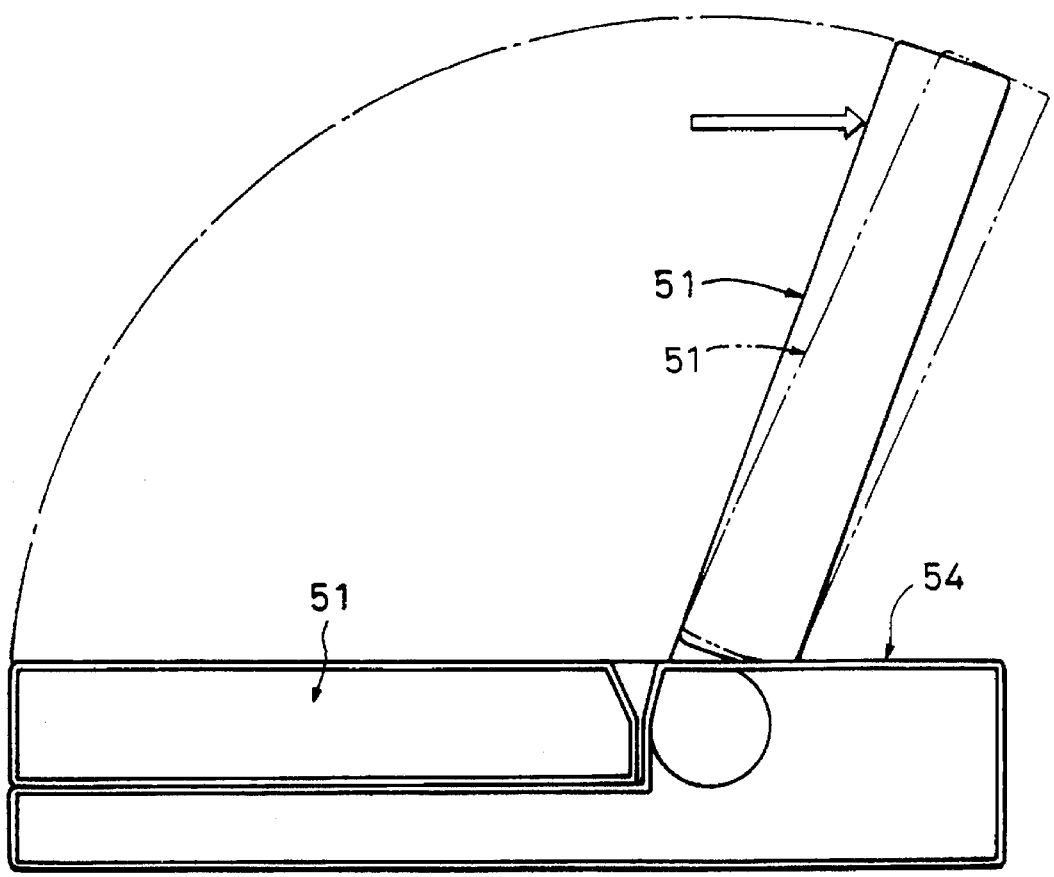
FIG. 18 is a schematic side view showing a state of touch panel input on a conventional information processing apparatus.

In the same manner, connecting shafts 16 for the connecting members 10 are provided at right and left intermediate portions of the main body 3 of the apparatus. Each of the connecting shafts 16 is supported on the main body 3 of the apparatus by a supporting member 17, and is fixed within the connecting member 10 by a fixing member 18. According to such a connecting structure, the connecting members 10 are rotatable relative to the main body 3 of the apparatus in the directions of arrows g and h. A damping mechanism which utilizes a tightening torque and a loosening torque, such as the torsion coil spring 52 shown in FIG. 16, may be provided at a rotating portion comprising each of the connecting shafts 13 and 16. As shown in FIG. 6, a signal cord 19 for electrically connecting the display means 6 and the main body 3 of the apparatus is accommodated within the connecting members 10, and passes through the connecting shafts 13 and 16. The signal cord 19 is wired so as not to produce torsion even if the connecting members 10 rotate.

Figure 7:
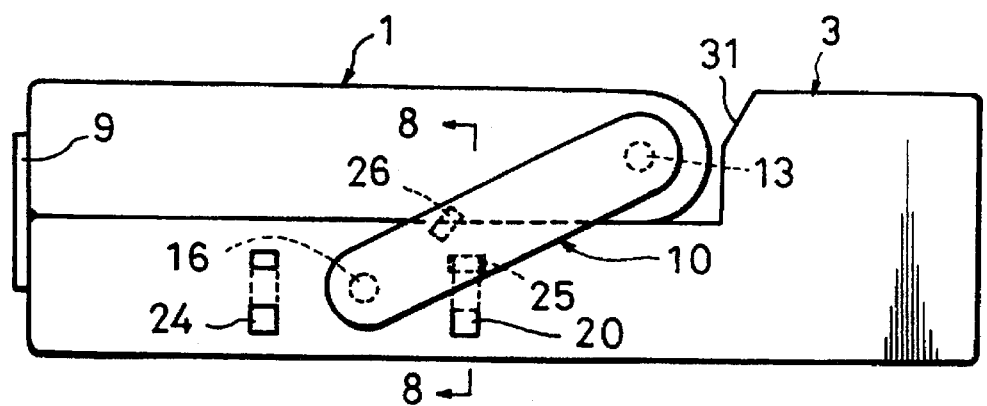
FIG. 7 is a side view showing the configuration of a connecting member holding means for holding the connecting member shown in FIG. 6 on the main body of the apparatus.
Figure 8:
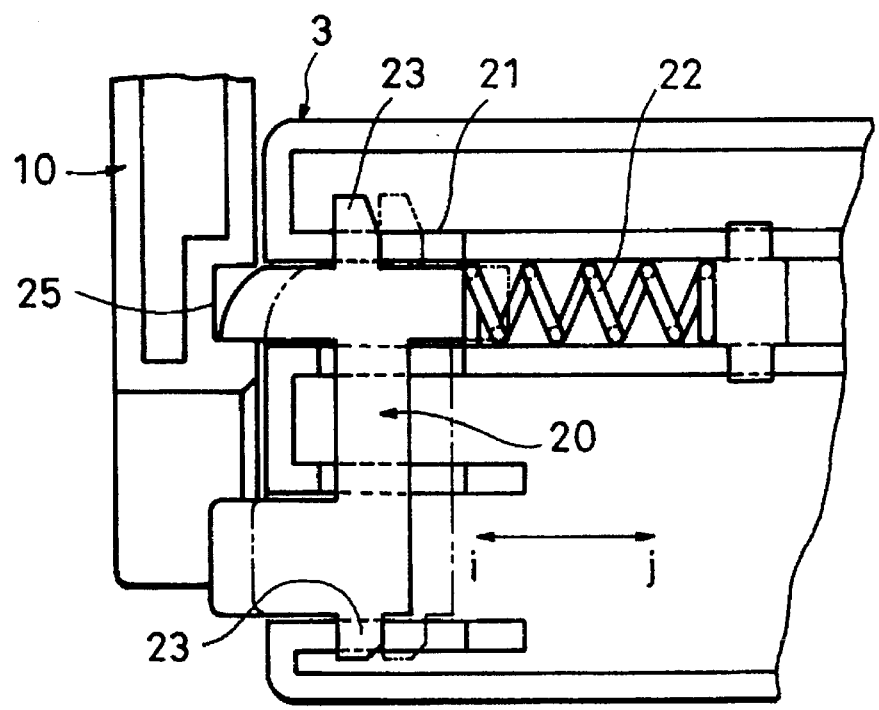
FIG. 8 is a partial cross-sectional view showing the detail of a connecting member holding mechanism provided at the back side taken along line 8—8 shown in FIG. 7.

FIG. 7 is a side view showing the arrangement of a holding mechanism for holding the connecting members 10 in the main body 3 of the apparatus. FIG. 8 is a partial cross-sectional view showing the structure of one of the holding mechanisms taken along line 8—8 shown in FIG. 7. The holding mechanisms each having the structure shown in FIG. 8 are provided at four portions, i.e., two at each of the right and left sides of the main body 3 of the apparatus. In FIG. 8, a holding hook 20 is supported so as to be movable in the directions of arrows i and j by a guide 21 provided in the main body 3 of the apparatus. The holding hook 20 is always driven in the direction of arrow i by a spring 22, and is held at the position of FIG. 8 by contacting stoppers 23, 23 formed at upper and lower portions of the hook 20 to an end surface of the guide 21. The holding mechanisms shown in FIG. 8 are provided at respective two portions of the both sides of the main body 3 of the apparatus. As shown in FIG. 7, the holding hook provided at the rear side is indicated by reference numeral 20, and a holding hook provided at the front side is indicated by reference numeral 24.

As shown in FIG. 7, there are provided a recess 25 formed at a position where the holding hook 20 at the rear side is engageable, and a recess 26 formed at a position where the holding hook 24 at the front side is engageable. Accordingly, the connecting member 10 is configured so as to be held between two positions, i.e., a first position where the holding hook 20 engages the recess 25 and a second position where the holding hook 24 engages the recess 26. Solid lines shown in FIG. 8 indicate an engaged state of the holding mechanism at the rear side, i.e., a state wherein the hook 20 engages the recess 25. Two-dot chain lines indicate a state wherein the engagement is released by depressing the hook 20.

Figure 9:
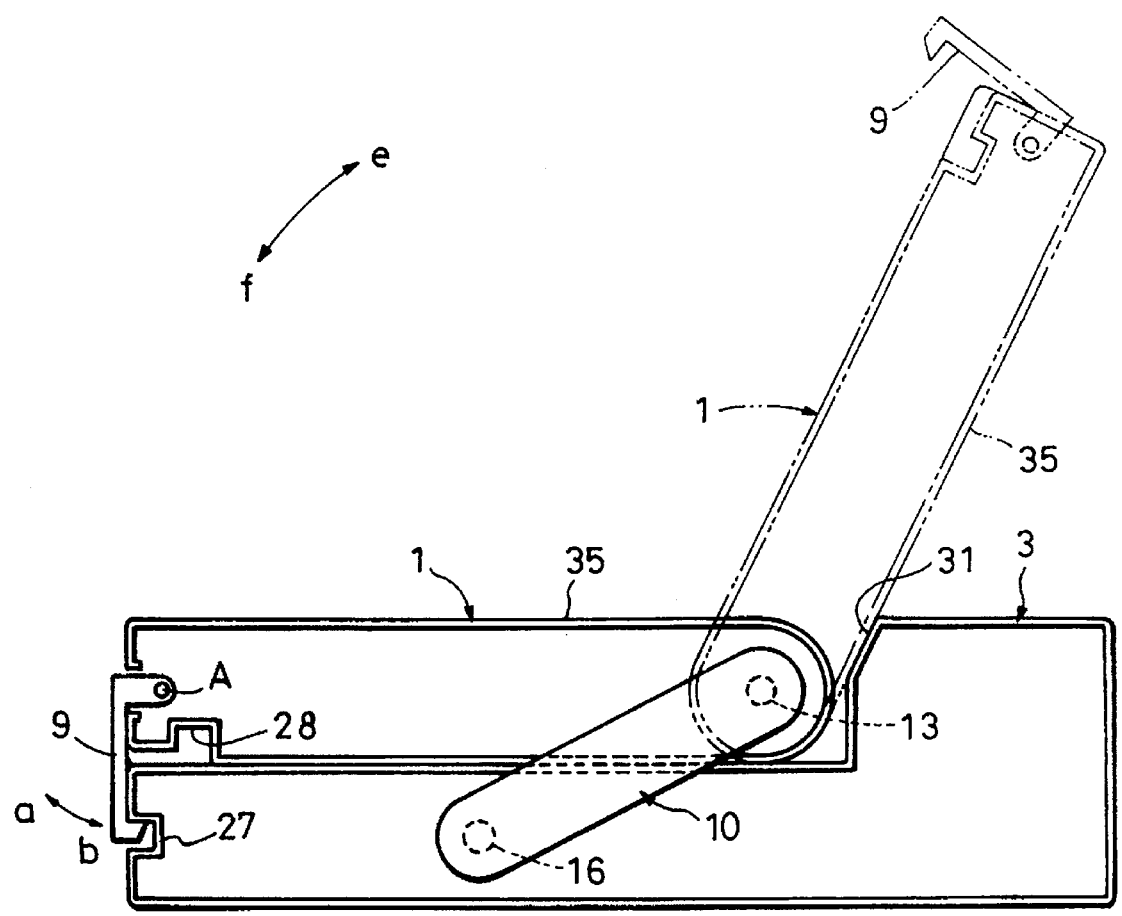
FIG. 9 is a side view showing a state of rotating the display unit supporting means from a closed position to an opened position.
Figure 10:
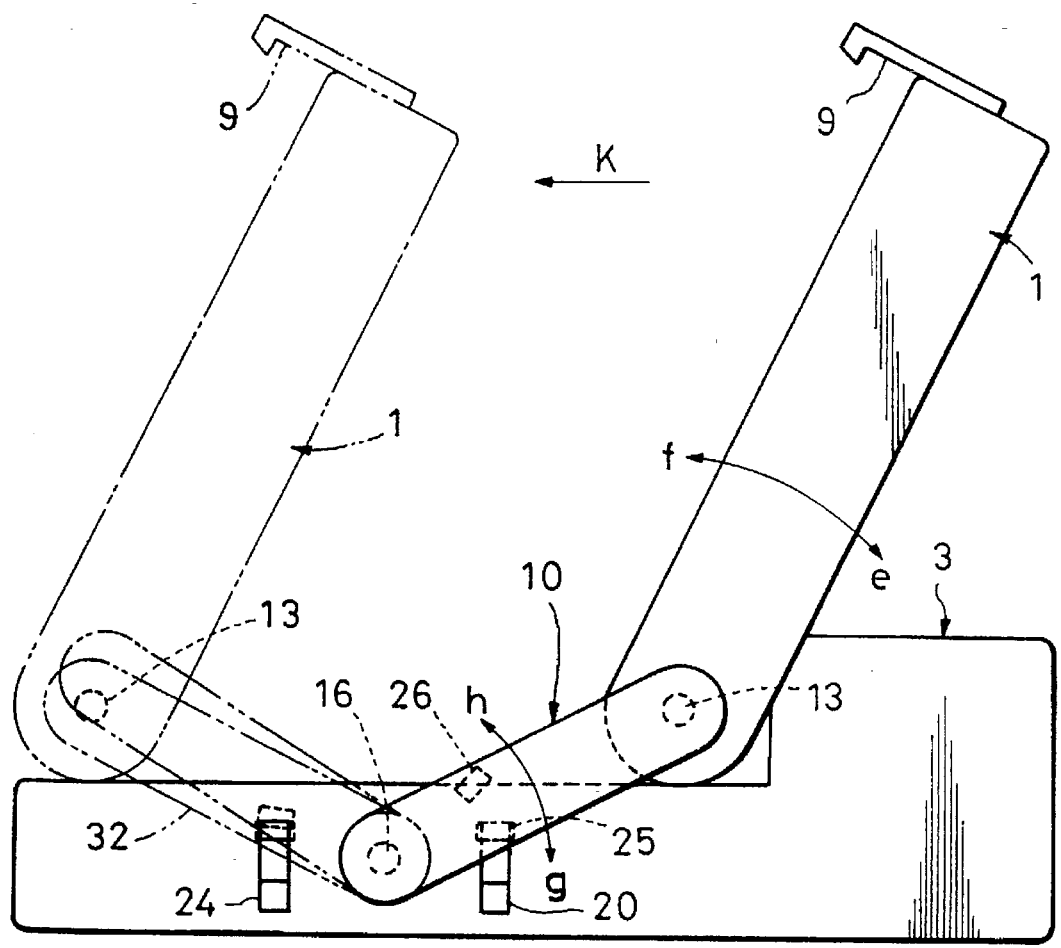
FIG. 10 is a side view showing a state of forwardly moving the display unit supporting means while keeping it in an opened state.
Figure 11:
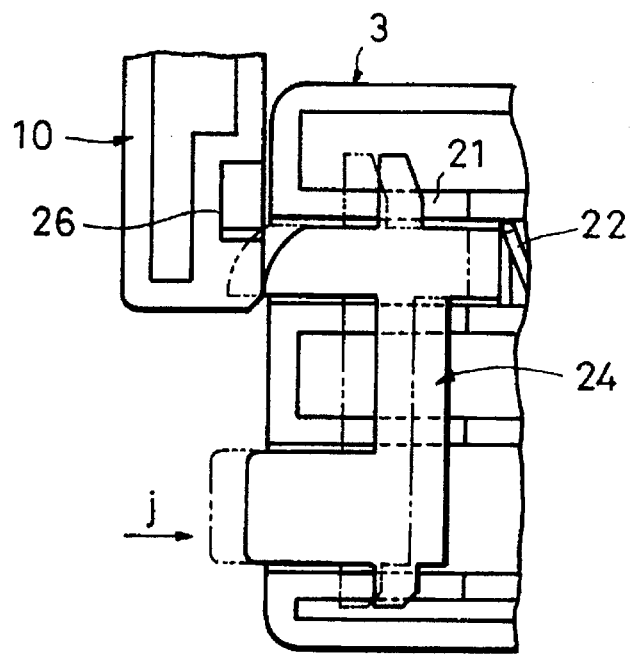
FIG. 11 is a partial cross-sectional view showing a state of depressing the holding hook of the connecting member supporting mechanism provided at the front side.
Figure 12:
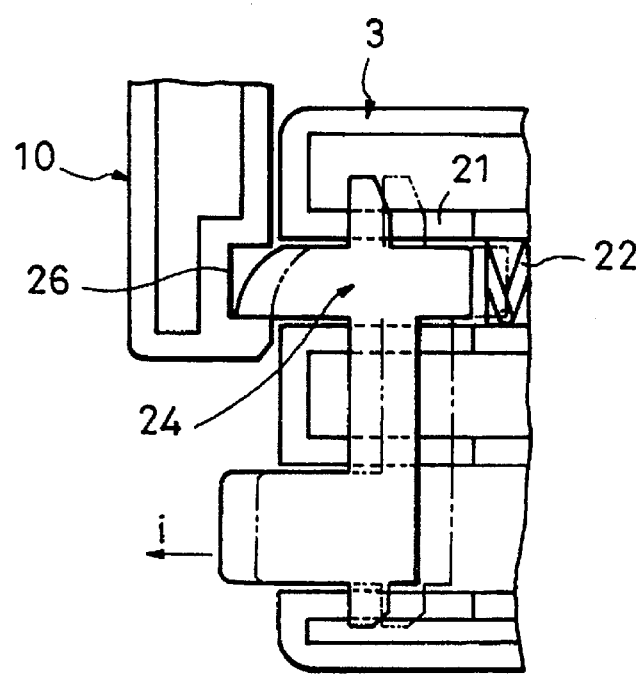
FIG. 12 is a partial cross-sectional view showing a state wherein the holding hook of the connecting member supporting mechanism moves to an engaged position by a spring force.
Figure 13:
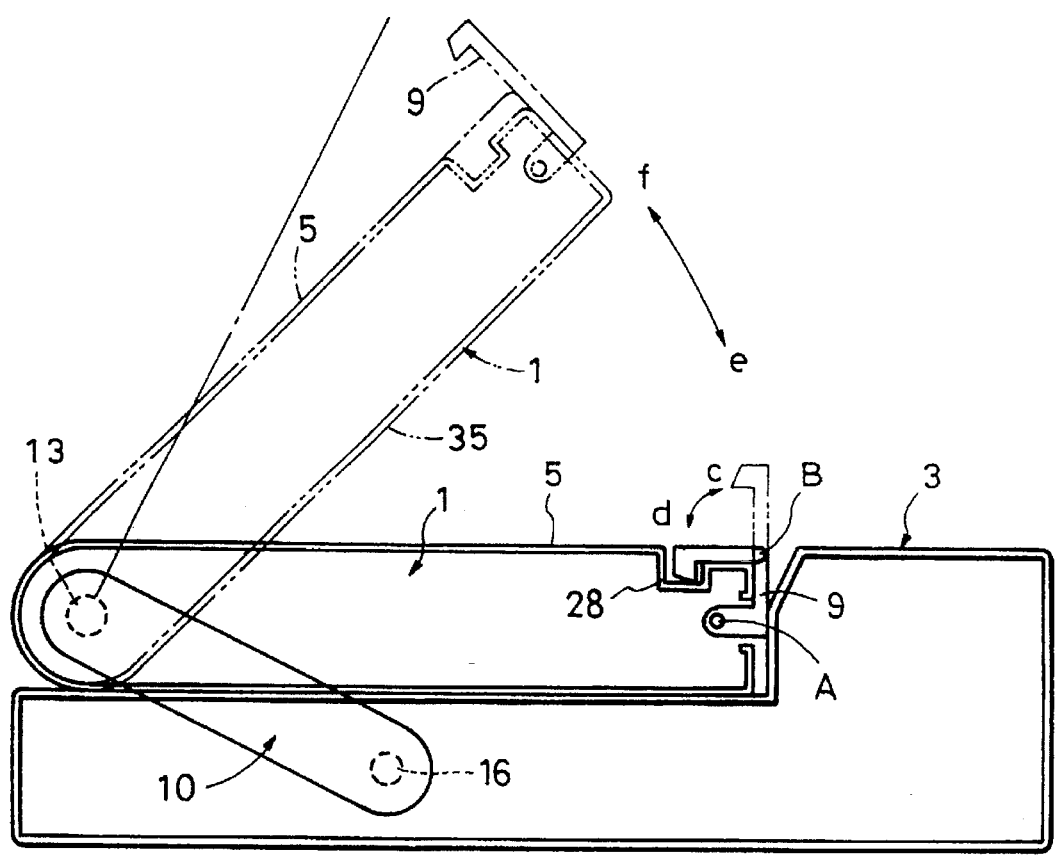
FIG. 13 is a side view showing a state of rotating the display unit supporting means to a substantially horizontal touch panel input position.
Figure 14:
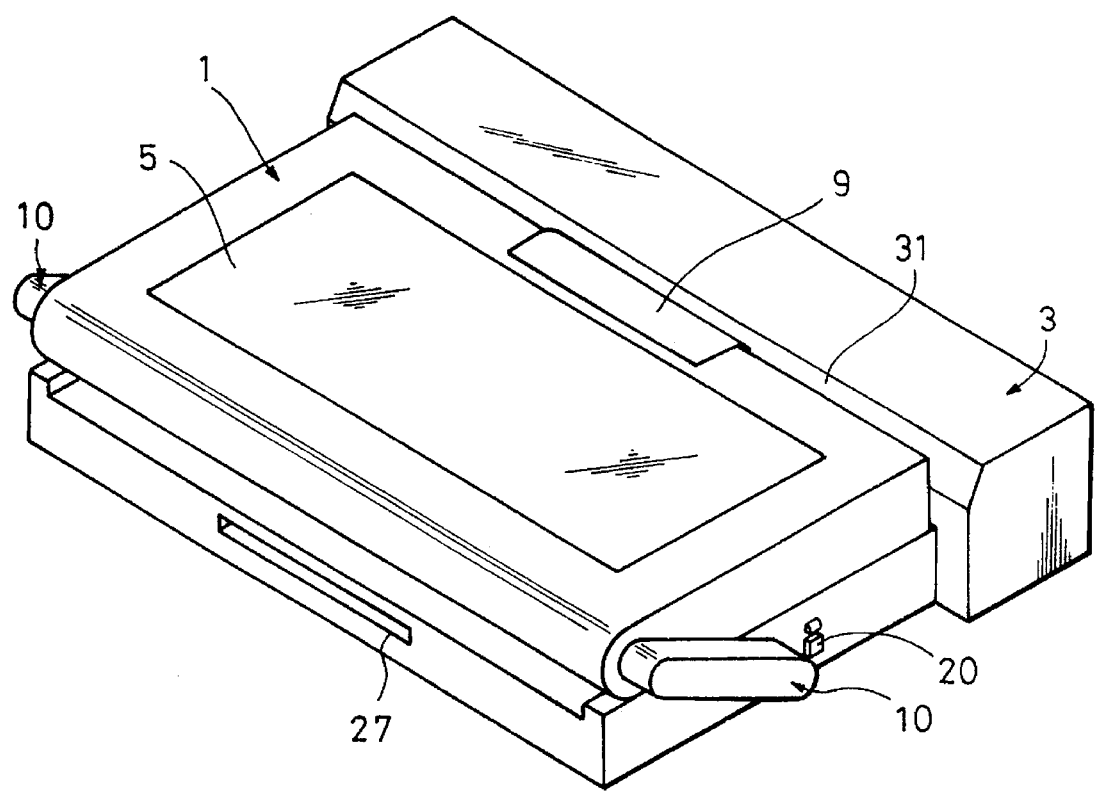
FIG. 14 is a perspective view of an appearance showing a state suitable for touch panel input on the information processing apparatus.

FIG. 9 is a side view showing a state of rotating the display unit supporting means 1 between a folded position (indicated by solid lines) and an upright position (indicated by two-dot chain lines). FIG. 10 is a side view showing a state of forwardly moving the display unit supporting means 1 in an upright state. FIG. 11 is a cross-sectional view showing a state of releasing the holding hook 24 at the front side from the recess 26 by depressing the holding hook 24. FIG. 12 is a cross-sectional view showing a state wherein the holding hook 24 at the front side engages within the recess 26 by a restoring force of the spring 22. FIG. 13 is a side view showing a state of rotating the display unit supporting means 1 which has been moved to the front side from an upright position to a touch panel input position (indicated by solid lines) which is substantially horizontal. FIG. 14 is a perspective view showing a state suitable for touch panel input wherein the display unit supporting means 1 is superposed on the main body 3 of the apparatus so that the touch panel 5 assumes a face-up state.

Next, an explanation will be provided of the operation when the information processing apparatus is used with reference to FIGS. 9–14. In FIG. 9, the hook 9 is first detached from the recess 27 in the front portion of the main body 3 of the apparatus by rotating the hook 9 in the direction of arrow a from a state of accommodating (folding) the display unit supporting means 1 indicated by solid lines. Subsequently, the display unit supporting means 1 is rotated around the connecting shaft 13 for the connecting members 10 in the direction of arrow e so as to assume an opened position (upright position) where a back surface 35 of the display unit supporting means 1 contacts an inclined portion 31 of the main body 3 of the apparatus. This opened position corresponds to a holding position where the apparatus is used while watching the image display unit (display surface) of the display unit supporting means 1. If the holding hooks 20 are depressed in the direction of arrow j shown in FIG. 8, the holding hooks 20 are detached from the recesses 25, whereby the connecting members 10 become rotatable around the connecting shaft 16 for the main body 3 of the apparatus in the direction of arrows g and h (see FIG. 10).

Subsequently, the display unit supporting means 1 is moved to the direction of arrow K while being kept in an opened (upright) state relative to the main body 3 of the apparatus. That is, the display unit supporting means 1 is moved to the front side of the main body 3 of the apparatus by rotating the connecting members 10 in the direction of arrow h relative to the main body 3 of the apparatus, and rotating the display unit supporting means 1 in the direction of arrow e relative to the connecting members 10. At that time, as shown in FIG. 11, the connecting members 10 contact the holding hooks 24 at the front side to push the holding hooks 24 in the direction of arrow j. When the recesses formed in the connecting members 10 reach the positions of the holding hooks 24, the holding hooks 24 are moved (protruded) in the direction of arrow i by a restoring force of the springs 22 to engage the recesses 26 of the connecting members 10, as shown in FIG. 12. By the engagement of the holding hooks 24 with the recesses 26, the connecting members 10 are held at positions indicated by two-dot chain lines 32 shown in FIG. 10.

Subsequently, if the display unit supporting means 1 is rotated around the connecting shaft 13 for the connecting members 10 in the direction of arrow e, the display unit supporting means 1 is supported in a state wherein the back surface of the display unit supporting means 1 is superposed on the main body 3 of the apparatus. That is, as indicated in FIG. 13 by solid lines, the display unit supporting means 1 is supported while being superposed on the main body 3 of the apparatus in a substantially horizontal posture wherein the image display unit (display surface) including the touch panel 5 is in a face-up state. At that time, as shown in FIG. 1, since the keyboard 4 is disposed lower than the surface of the main body 3 of the apparatus, the back surface 35 of the display unit supporting means 1 does not touch the keyboard 4. As indicated in FIG. 13 by solid lines, by rotating a portion of the hook 9 close to the front end thereof around point B in the direction of arrow d, the hook 9 can be accommodated within a recess 28 provided in the display unit supporting means 1.

According to the above-described embodiment, the connecting members 10 are provided between the display unit supporting means 1 and the main body 3 of the apparatus, and the connecting shaft 13 between the display unit supporting means 1 and the connecting members 10, and the connecting shaft 16 between the main body 3 of the apparatus and the connecting members 10 are rotatable. Hence, as shown in FIG. 14, it becomes possible to place the display unit supporting means 1 while being substantially horizontally superposed on the main body 3 of the apparatus in a state wherein the display surface (image display unit) including the touch panel 5 is in a face-up state. Accordingly, the touch panel 5 can be used as an input means in a state wherein the display unit supporting means 1 is stably supported in a substantially horizontal posture on the main body 3 of the apparatus. Hence, deflection or movement will not occur in the display unit supporting means 1 even if the user depresses the touch panel 5 from above, whereby it is possible to increase operability and operational feeling when touch panel input is performed, and to reduce burden on arms.

Figure 15:
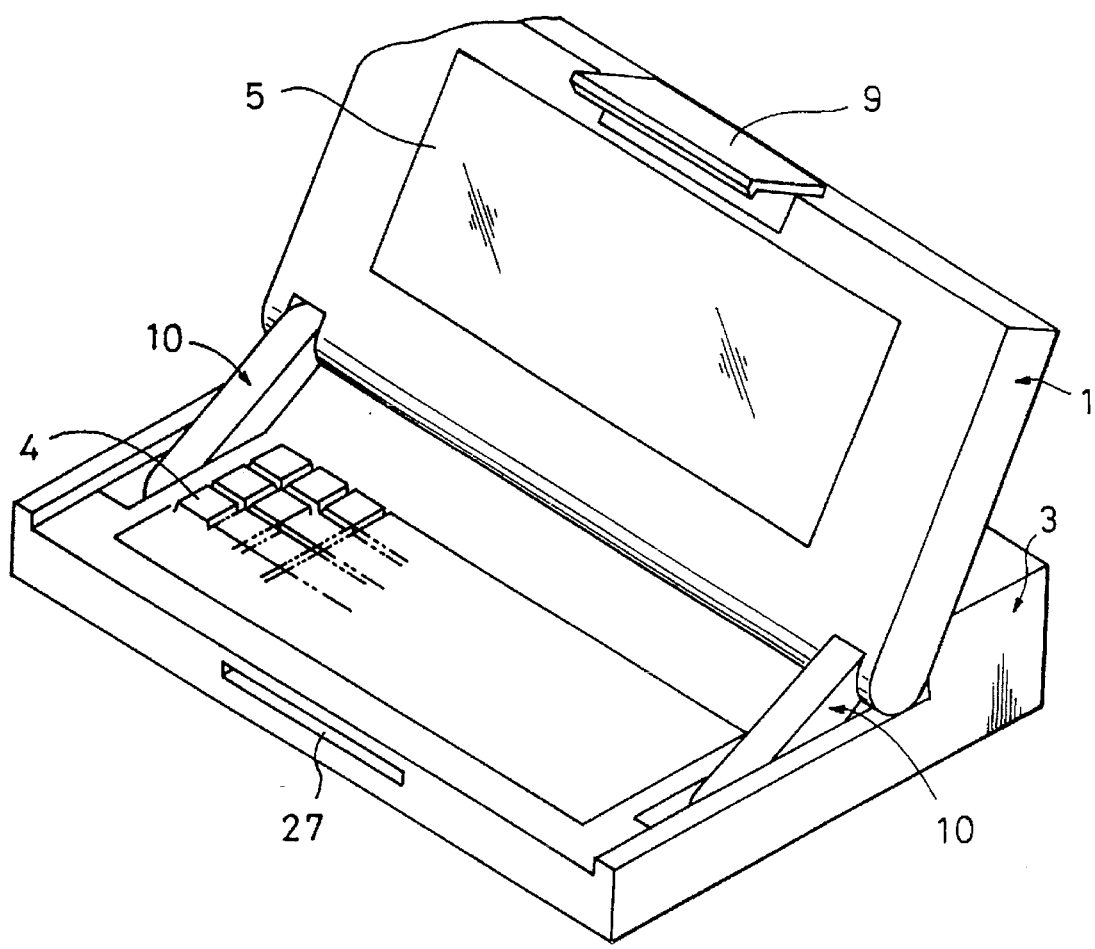
FIG. 15 is a perspective view of an appearance showing a state suitable for keyboard input on an information processing apparatus according to a modification of the first embodiment.

The display unit supporting means 1 can be easily moved between a position for use shown in FIGS. 1 and 15 where keyboard input is performed while watching the display surface (image display unit), and a position for use shown in FIG. 14 where touch panel input is performed while watching the display surface. Hence, it becomes possible to provide an optimum environment for use for both when the keyboard 4 is used and when the touch panel 5 is used. While, in the present embodiment, a mechanism of holding the connecting members 10 relative to the main body 3 of the apparatus by engagement of the holding hooks 20 and 24 with the recesses 25 and 26, the present invention is not limited to this structure.

FIG. 15 is a perspective view of an appearance of an information processing apparatus illustrating a modification of the above-described embodiment. In this embodiment, the positions of the connecting units 13 and 16 (see FIGS. 6, 10 and 13) of the connecting members 10 for the display unit supporting means 1 and the main body 3 of the apparatus are provided not at the sides of the apparatus, but inside the display unit supporting means 1 and the main body 3 of the apparatus. This embodiment differs from the above-described embodiment in that the connecting units 13 and 16 are provided inside the apparatus, but has substantially the same configuration as the above-described embodiment in other portions. Hence, corresponding components are indicated by the same reference numerals, and detailed explanation thereof will be omitted. The same functions and effects as those in the above-described embodiment can be also obtained in this embodiment.

As is apparent from the foregoing explanation, according to the present embodiment, an information processing apparatus comprising display unit supporting means for holding an information display unit for displaying information and a touch panel for inputting information is configured such that a lower-end portion of the display unit supporting means and an intermediate portion of a main body of the apparatus are connected by connecting members via rotatable connecting units so that the display unit supporting means can be substantially horizontally placed on the main body of the apparatus with the touch panel in a face-up state. Hence, an information processing apparatus, which can prevent deformation of display unit supporting means when a touch panel is used, improve operability and operational feeling when an input operation is performed from the touch panel, and reduce fatigue of arms during operation, is provided.

Second Embodiment

Figure 19:
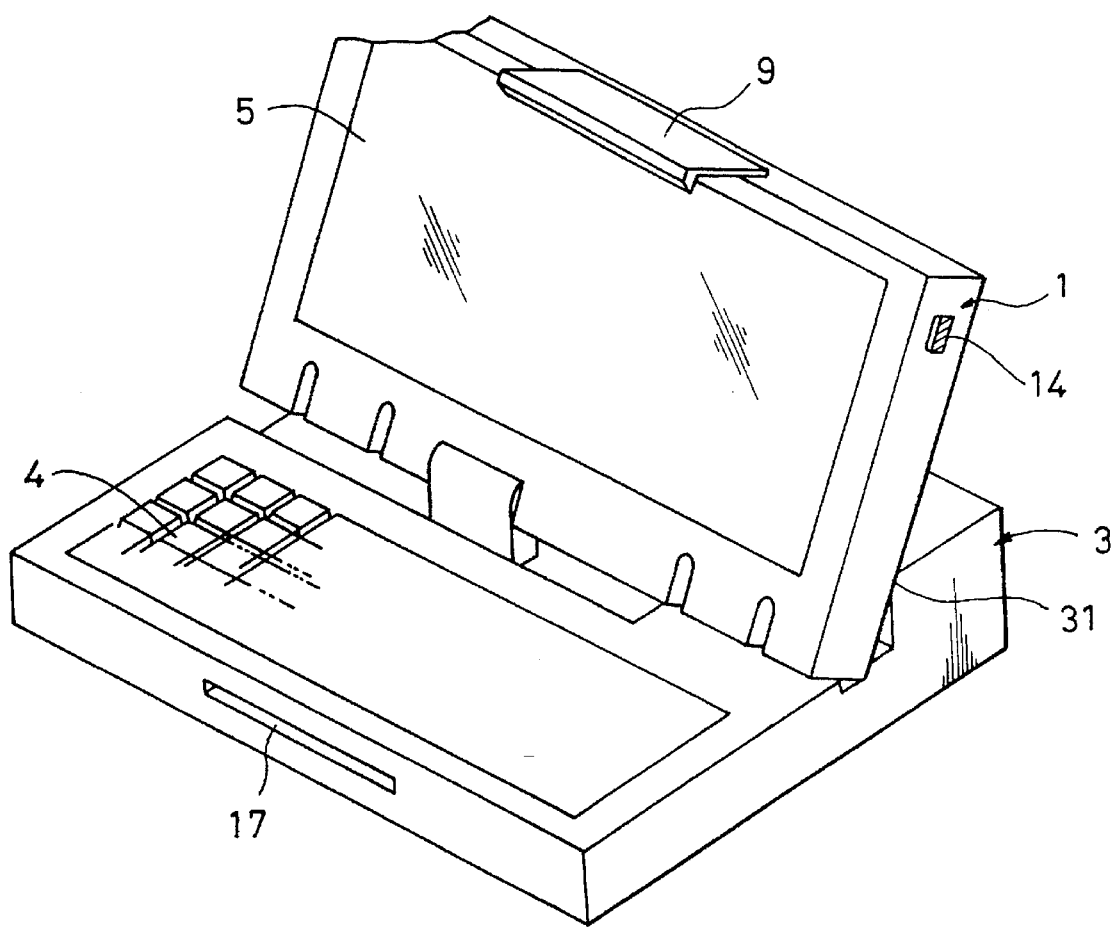
FIG. 19 is a perspective view of an appearance of an information processing apparatus according to a second embodiment of the present invention.

FIG. 19 is a perspective view of an information processing apparatus according to a second embodiment of the present invention. In FIG. 19, a keyboard 4 for input operation is provided at a portion closer to the operator of the upper surface of a main body 3 of the apparatus. A display unit supporting means 1 for holding an information display unit for displaying information and a touch panel 5, serving as an input means, is detachably mounted on the main body 3 of the apparatus. The touch panel 5 is incorporated on the front surface of the information display unit (display surface) in a superposed state. In respective drawings illustrating the present embodiment, the same numerals indicate the same components (or equivalent components).

Figure 20:
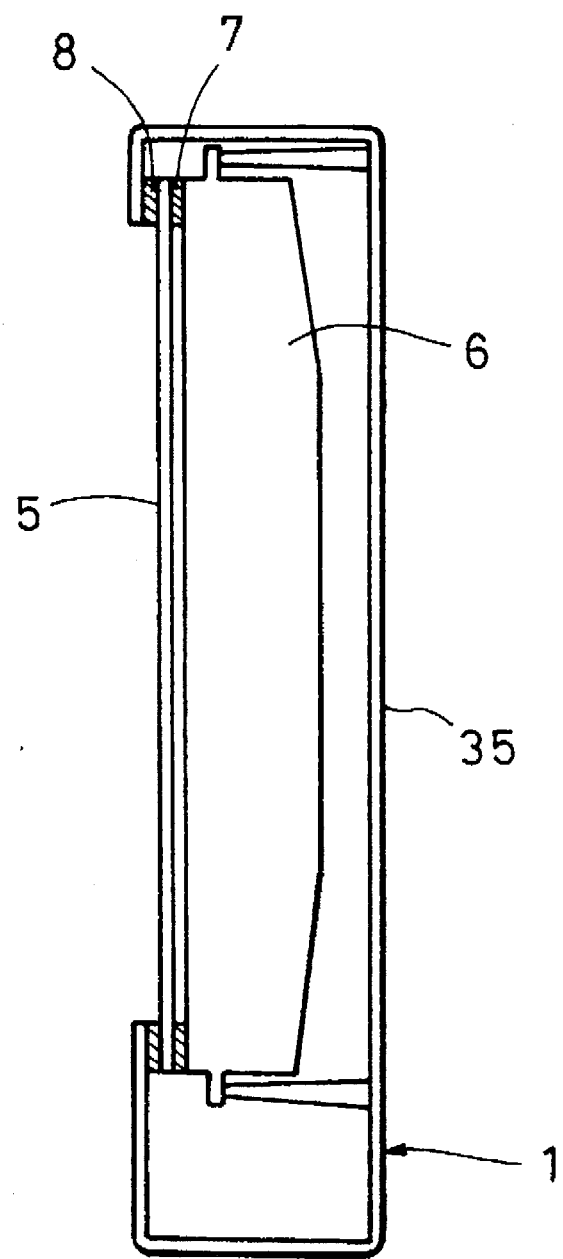
FIG. 20 is a vertical cross-sectional view showing the internal structure of a display unit supporting means shown in FIG. 19.

FIG. 20 is a vertical cross-sectional view showing the internal structure of the display unit supporting means 1. In FIG. 20, a packing 7 is disposed between a display means 6, such as a liquid-crystal display or the like, and the touch panel 5, so that the gap is minimized in order to prevent deviation between a display position and a touch position due to parallax, and the touch panel 5 does not contact the front surface (display surface) of the display means 6 by a pressing force. A packing 8 is also disposed between the display unit supporting means 1 and the touch panel 5 in order to prevent an erroneous operation due to a stress applied to the touch panel 5. A plane 35 substantially parallel to the touch panel 5 is formed on a surface (back surface) opposite to the display surface (the surface at the side of the touch panel 5) of the display unit supporting means 1. As will be described later, this parallel plane 35 is a portion which becomes a mounting plane (base plane) when the display unit supporting means 1 is detached from the main body 3 of the apparatus and mounted on a desk.

Figure 21:
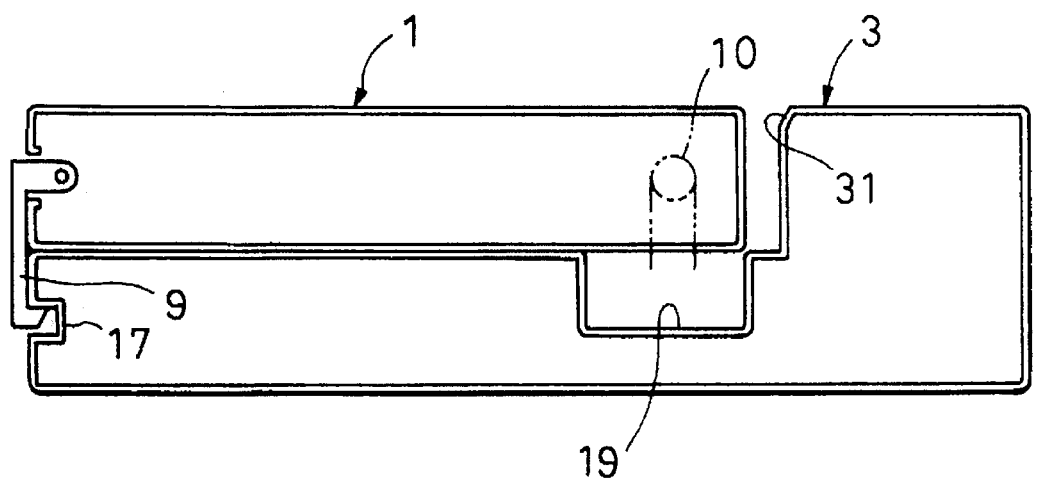
FIG. 21 is a vertical cross-sectional view showing the schematic configuration of a part of a mounting/demounting mechanism of the display unit supporting means.
Figure 22:
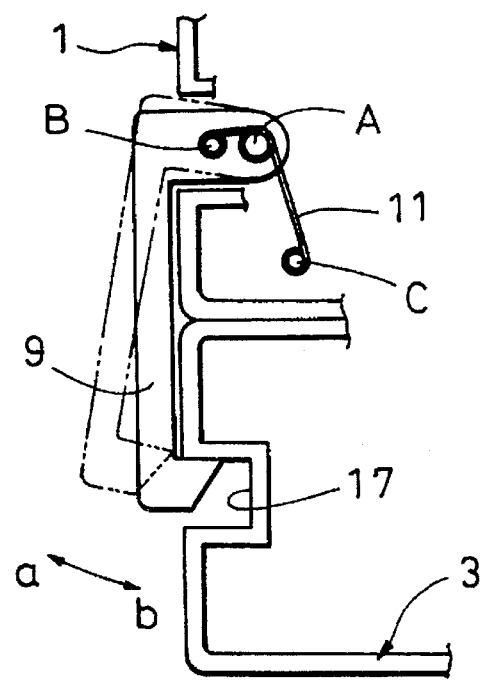
FIG. 22 is a partial vertical cross-sectional view showing the detail of a principal part of the mounting/demounting mechanism shown in FIG. 21.

FIG. 21 is a vertical cross-sectional view showing part of a mechanism of detouchably mounting the display unit supporting means 1 on the main body 3 of the apparatus. In FIG. 21, while the information processing apparatus is carried or accomodated, the display unit supporting means 1 is held on the main body 3 of the apparatus by a hook 9 provided in a front portion of the apparatus and a shaft 10 disposed at a backward position of the apparatus. FIG. 22 is a partial vertical cross-sectional views showing the detailed structure of the hook 9. In FIG. 22, the hook 9 is rotable around a fulcrum A provided on the display unit supporting means 1 in the directions of arrows a and b. The hook 9 is always driven in the direction of arrow b by a spring 11 both ends of which are fixed to point B on the hook 9 and point C in the display unit supporting means 1.

Figure 23:
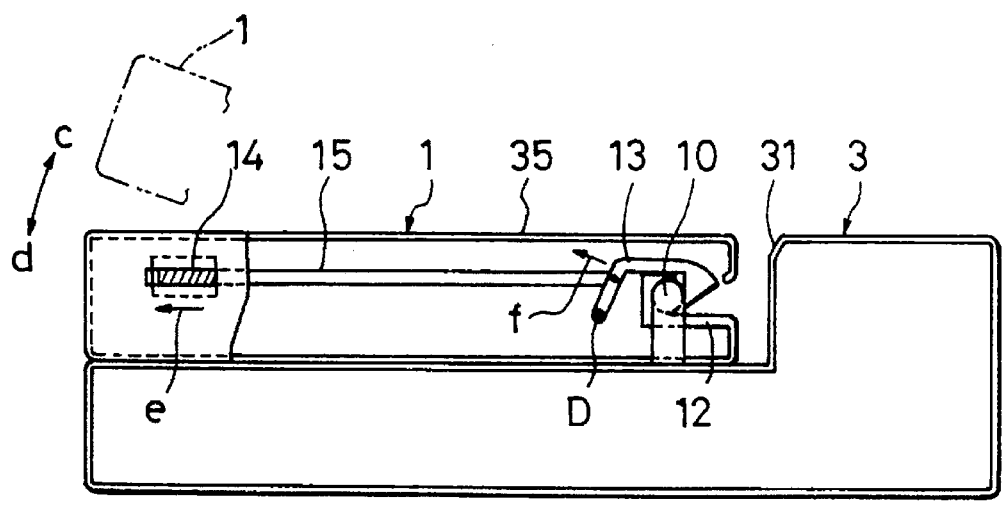
FIG. 23 is a vertical cross-sectional view showing the schematic configuration of another part of the mounting/demounting mechanism.
Figure 24:
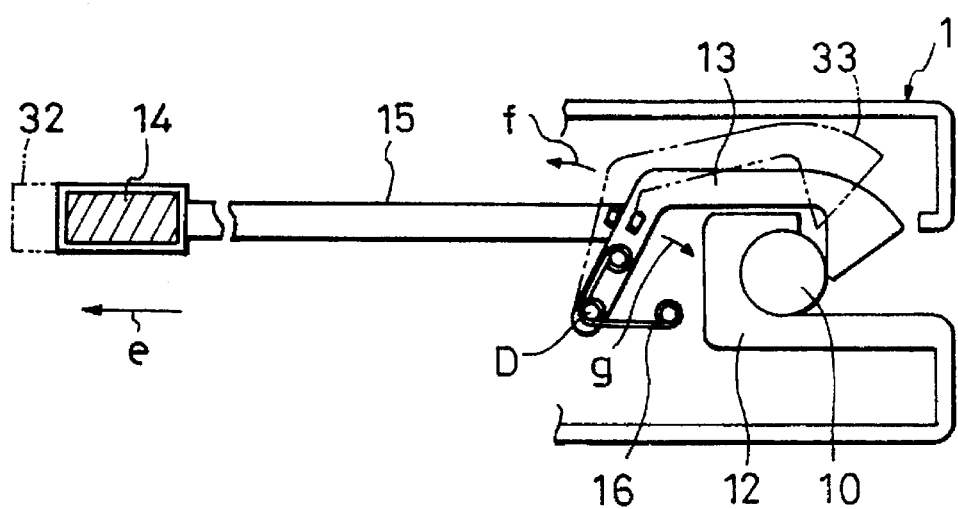
FIG. 24 is a partial vertical cross-sectional view showing the detail of a principal part of the mounting/demounting mechanism shown in FIG. 23.

FIG. 23 is a vertical cross-sectional view showing other portions of the detachable mounting mechanism of the display unit supporting means 1 relative to the main body 3 of the apparatus, and also illustrates a holding structure of the display unit supporting means 1 by the shaft 10 provided on the main body 3 of the apparatus. FIG. 24 is a detailed drawing of a principal part of FIG. 23. In FIGS. 23 and 24, the shaft 10 is provided on the main body 3 of the apparatus, and the display unit supporting means 1 is rotatably supported around the shaft 10 in the direction of arrows c and d by a bearing 12 and a hook 13. The bearing 12 and the hook 13 are provided at the side of the display unit supporting means 1. A lever 14 provided at a side of the display unit supporting means 1 is connected to a bar 15 and the hook 13. If the lever 14 is moved in the direction of arrow e, the hook 13 rotates around point D in the direction of arrow f. The hook 13 is driven in the direction of arrow g by a spring 16. Accordingly, if the lever 14 is released, the hook 13 automatically returns to the original position.

Figure 25:
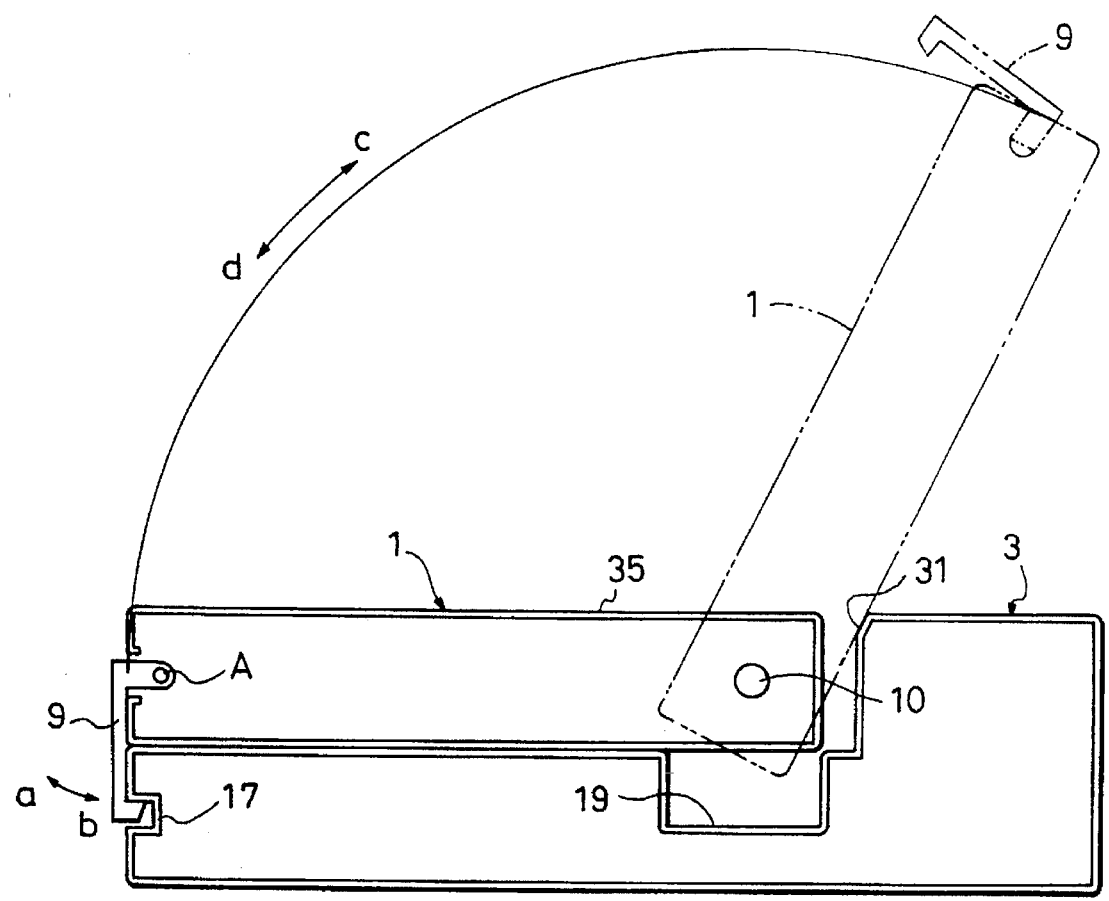
FIG. 25 is a schematic vertical cross-sectional view showing an opening/closing (rotating) operation of the display unit supporting means.

FIG. 25 is a vertical cross-sectional view showing the operation of a supporting structure of the display unit supporting means 1. An explanation will be provided of an operational method when the display unit supporting means 1 is used with reference to FIG. 25. From a state wherein the display unit supporting means 1 is folded (closed), the hook 9 is first detached from a recess 17 provided in the main body 3 of the apparatus by rotating the hook 9 in the direction of arrow a (see FIG. 22). Subsequently, the display unit supporting means 1 is rotated around the shaft 10 in the direction of arrow c to contact an inclined portion 31 formed at a predetermined position of the main body 3 of the apparatus. The display unit supporting means 1 is held in a state of contacting the inclined portion 31, and the user can see the image display unit (display surface) on the display unit supporting means 1.

In FIG. 24, if the lever 14 provided at the side of the display unit supporting means 1 is moved to a position indicated by two-dot chain lines 32 in the direction of arrow e, the hook 13 rotates in the direction of arrow f and moves to a position indicated by two-dot chain lines 33. In this state, since the bearing 12, provided in the display unit supporting means 1, engages the shaft 10, the display unit supporting means 1 can be detached from the main body 3 of the apparatus. As described above, since the display unit supporting means 1 is detachable relative to the main body 3 of the apparatus, it becomes possible to mount the display unit supporting means 1 on a desk when the image processing apparatus is used. In that case, since a surface 35, substantially parallel to the touch panel 5, is formed on the back surface of the display unit supporting means 1, the display unit supporting means 1 can be mounted on a desk in a stable state.

Figure 26:
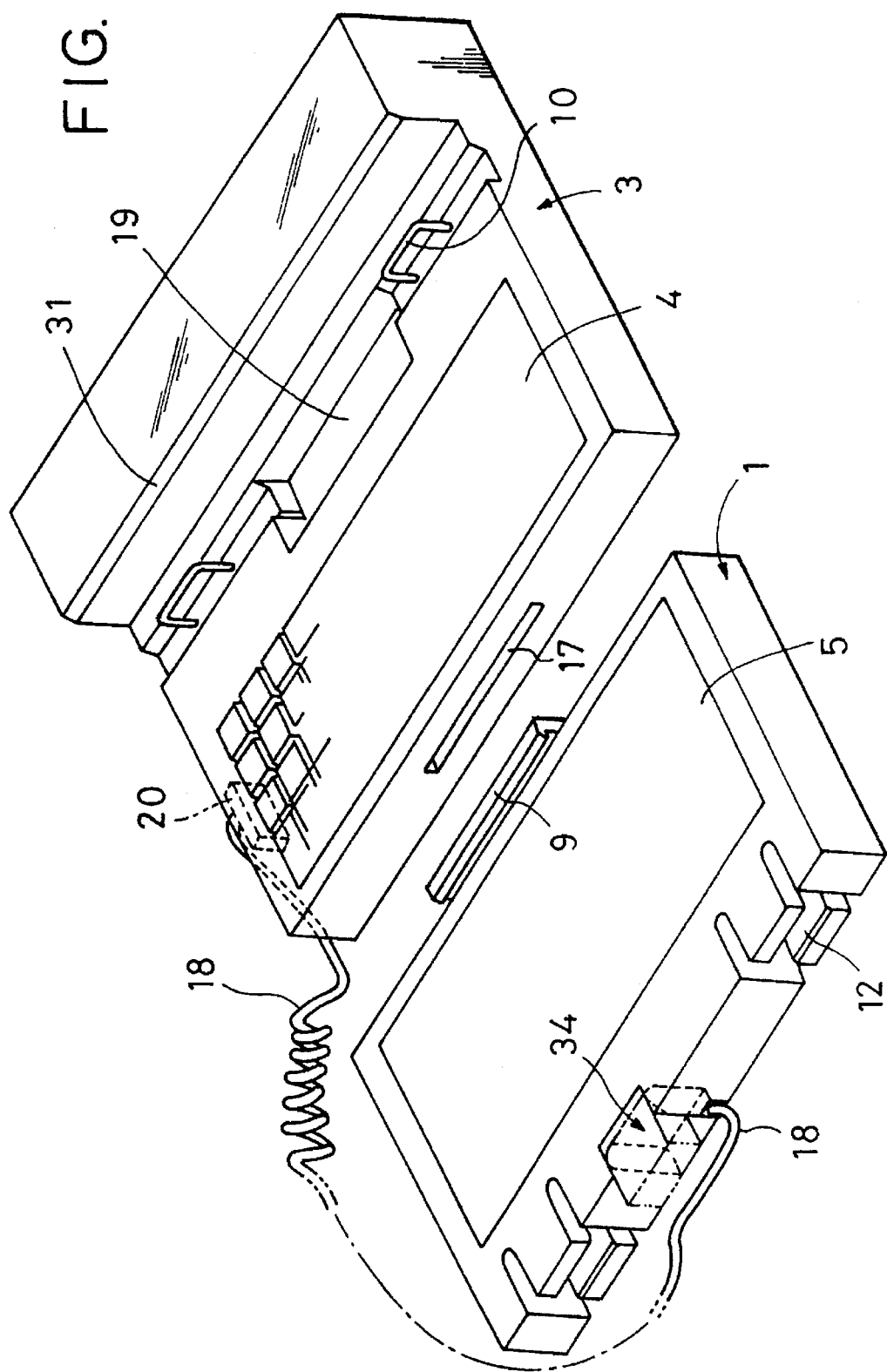
FIG. 26 is a perspective view showing a state of the use of the apparatus wherein the display unit supporting means is detached.

FIG. 26 is a perspective view showing a state wherein the display unit supporting means 1 is detached from the main body 3 of the apparatus. In FIG. 26, when the display unit supporting means 1 is detached and mounted on a desk, and the touch panel 5 is used as an input means, the user can depress the touch panel 5 from above, and the display unit supporting means 1 is mounted in a stable state due to the substantially parallel back surface 35. Hence, the display unit supporting means 1 is not deflected or moved, whereby it becomes possible to increase operability and operational feeling in an input operation, and to reduce burden on arms of the user in operation.

Figure 27:
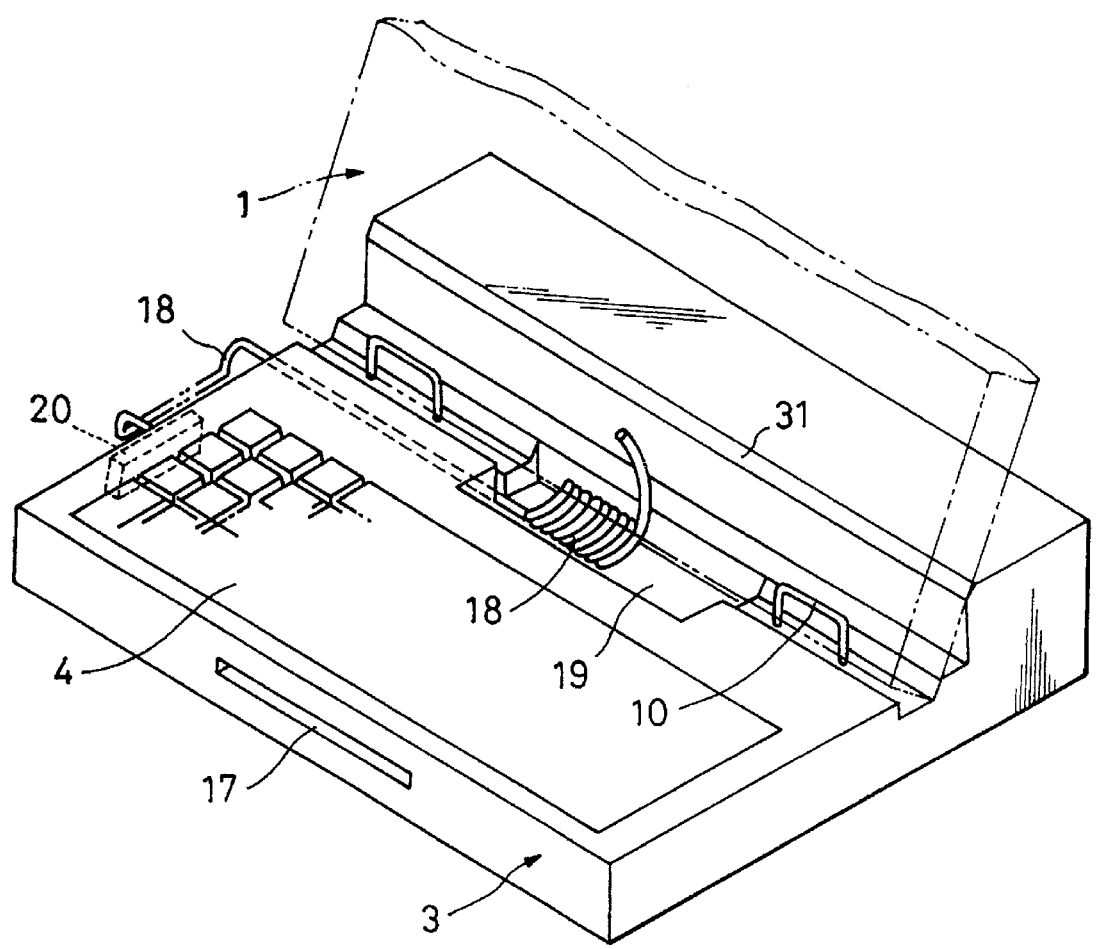
FIG. 27 is a perspective view showing a state of accomodating a cable for signal transmission in the information processing apparatus shown in FIG. 26.

Next, an explanation will be provided of an electrical connecting means for the display means 6 (see FIG. 20) and main body 3 of the apparatus when the display unit supporting means 1 is detached from the main body 3 of the apparatus. In FIGS. 26 and 27, the main body 3 of the apparatus and the display means 6 (a liquid-crystal display or the like) are electrically connected using a cable 18. In a normal state wherein the display unit supporting means 1 is not detached from the main body 3 of the apparatus, but is opened and closed on the main body 3 of the apparatus, the cable 18 is accommodated within a recess 19 formed in the main body 3 of the apparatus, as shown in FIG. 27. As shown in FIGS. 26 and 27, a connector 20 for the cable 18 to be connected to the display unit supporting means 1 at the side of the main body 3 of the apparatus is provided at a side of the main body 3 of the apparatus.

Figure 28:
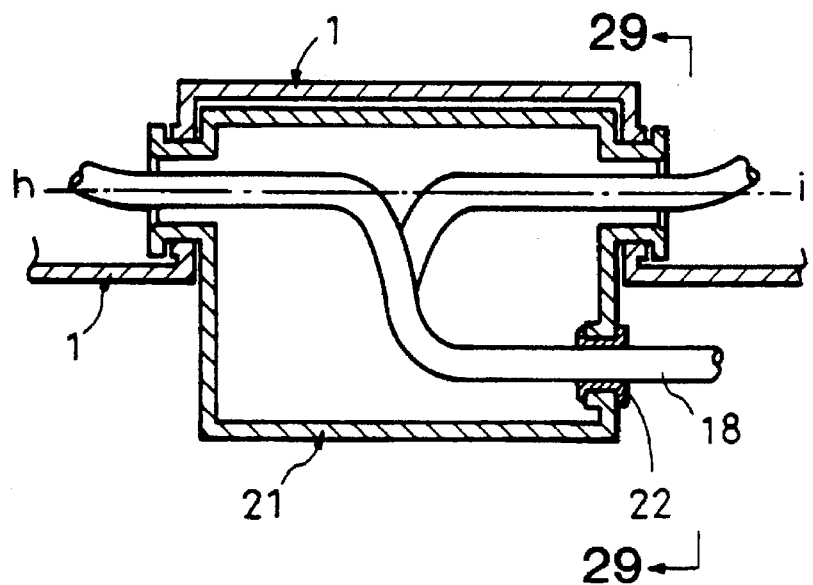
FIG. 28 is a partial cross-sectional view showing the structure of a connecting unit for the cable for signal transmission in the information processing apparatus shown in FIGS. 25 and 26.
Figure 29:
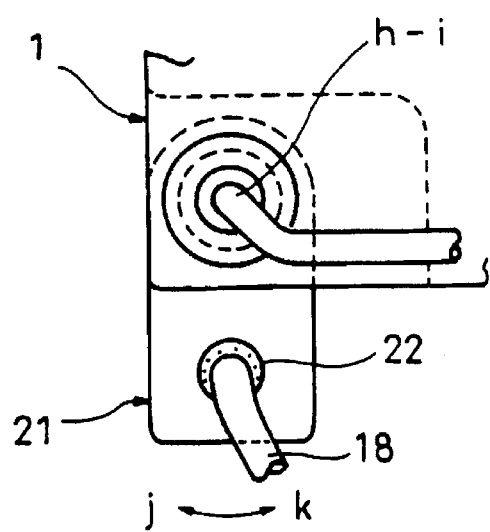
FIG. 29 is a side view, as seen along line 29—29 shown in FIG. 28.

In FIG. 26, there is shown a connecting unit 34 for the cable 18 provided at the side of the display unit supporting means 1. FIGS. 28 and 29 are diagrams showing the detail of the connecting unit 34 for the cable 18 at the side of the display unit supporting means 1. FIG. 28 is a cross-sectional view along the rotation shaft of the connecting unit 34. FIG. 29 is a side view as seen along line 29—29 shown in FIG. 28. The connecting unit 34 is provided at a lower portion of the display unit supporting means 1, that is, in the vicinity of the central shaft 10 of rotation. In FIGS. 26, 28 and 29, a movable (rotatable) box-like member 21 is provided near the center of the lower portion (in the vicinity of the central shaft 10 of rotation) of the display unit supporting means 1. The box-like member 21 is mounted so as to be rotatable in the direction of arrows j and k shown in FIG. 29 by making line h–i shown in FIG. 28 the center of axis. As shown in FIGS. 28 and 29, the cable 18 is introduced within the display unit supporting means 1 passing through the box-like member 21. There is also shown a damper (a grommet made of rubber-like elastic member) 21 for cable protection mounted in a cable accommodating hole of the box-like member 21.

Figure 30:
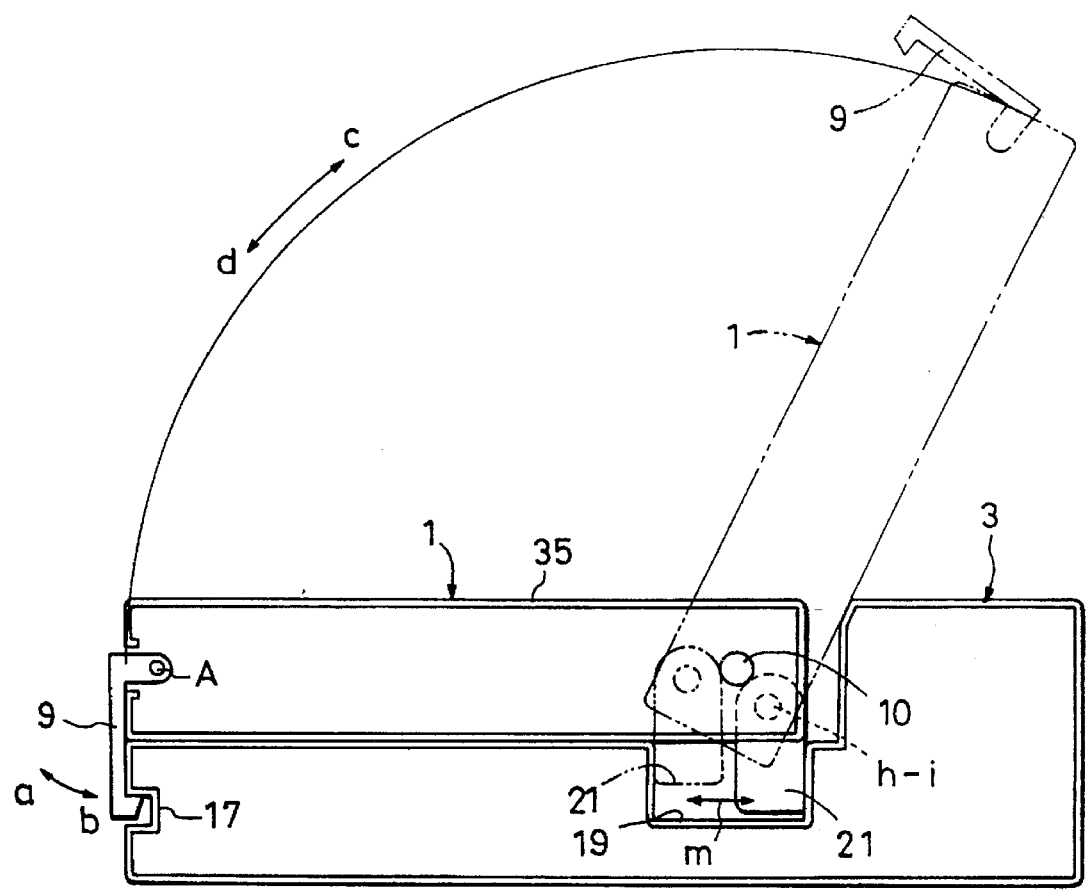
FIG. 30 is a vertical cross-sectional view of the information processing apparatus for showing the operation of the cable connecting unit shown in FIGS. 28 and 29.

FIG. 30 is a vertical cross-sectional view illustrating the movement of the box-like member 21 when the information processing apparatus is used and carried (not used), that is, when the display unit supporting means 1 is opened and closed respectively. In FIG. 30, at a closed position where the display unit supporting means 1 is held on the main body 3 of the apparatus by the hook 9, the box-like member 21 is accommodated in the recess 19 of the main body in a substantially vertical (substantially orthogonal) state relative to the display unit supporting means 1, as indicated by solid lines shown in FIG. 30. In this case, as explained with reference to FIGS. 26 and 27, the recess 19 is used also for accommodating the cable 18.

In a state of use of the apparatus, when the hook 9 is detached and the display unit supporting means 1 is rotated around the shaft 10 in the direction of arrow c to contact an inclined portion 51 of the main body 3 of the apparatus, the box-like member 21 is moved in the direction of arrow m in the recess 19 of the main body while inversely rotating around the axis h–i (FIG. 28). That is, since the box-like member 21 is rotatably mounted relative to the display unit supporting means 1, the box-like member 21 merely moves more or less in the recess 19 in the direction of m, even if the diplay unit supporting means 1 rotates around the shaft 10. The box-like member 21 is held in a state of being always fitted and accommodated in the recess 19 of the main body, and is not detached from the recess 19 of the main body. Accordingly, even if the display unit supporting means 1 is rotated, torsion does not occur in the cable 18 passing through the box-like member 21. That is, it is possible to prevent torsion of the cable 18 for electrically connecting the control circuit of the main body 3 of the apparatus and the display means 6 in the display unit supporting means 1.

According to the above-described embodiment, since the display unit supporting means 1 is detachable relative to the main body 3 of the apparatus, it becomes possible to place the display unit supporting means 1 on a desk in the same manner as the main body 3 of the apparatus. Accordingly, when the touch panel 5 is used as an input means, the touch panel 5 is depressed from above, and the display unit supporting means 1 is not deformed. Hence, it becomes possible to increase operability and operational feeling in touch panel input. At the same time, it become possible to reduce burden on arms during a touch panel operation, and to prevent fatigue of arms even if the apparatus is used for a long time.

According to the above-described embodiment, the rotatable box-like member 21 is provided at an electrical connecting portion between the display unit supporting means 1 and the main body 3 of the apparatus, and the box-like member 21 is held in a state of being always fitted within the recess 19, and the cable 18 for electrical connection is wired by passing it through the box-like member 21. Hence, it becomes possible to securely prevent the generation of torsion of the cable 18 when the display unit supporting means 1 is opened and closed (rotated). Although, in the above-described embodiment, the rotatable box-like member 21 is provided at the side of the display unit supporting means 1, and the recess 19 for accommodating the box-like member 21 is provided at the side of the main body 3 of the apparatus, the configuration may be reversed, that is, the box-like member 21 may be provided at the side of the main body 3 of the apparatus, and the recess 19 may be formed at the side of the display unit supporting means 1.

As is apparent from the foregoing explanation, according to one aspect of the present invention, an information processing apparatus comprising display unit supporting means for holding an information display unit for displaying information and a touch panel, serving as an input means, is configured such that a plane substantially parallel to the touch panel is formed at a back surface of the display unit supporting means, and the display unit supporting means is detachable relative to the main body of the apparatus. Hence, it is possible to provide an information processing apparatus which can prevent deformation of the display unit supporting means when the touch panel is used, improve operability and operational feeling when an input operation is performed from the touch panel, and reduce fatigue of arms during operation.

According to another aspect, an information processing apparatus comprising display unit supporting means for holding an information display unit for displaying information is configured such that one end of the display unit supporting means is rotatably connected to the main body of the apparatus, a box-like member through which a signal transmitting member passes is rotatably provided at one of the main body of the apparatus and the display unit supporting means, and a recess in which the box-like member is fitted without being detached when the display unit supporting means rotates is provided at the other one of the main body of the apparatus and the display unit supporting means. Hence, it is possible to provide an information processing apparatus which can securely prevent torsion of a signal transmission member, such as a cable for connecting the main body of the apparatus and an image display unit even if a display unit supporting means is rotated.

Third Embodiment

Figure 31:
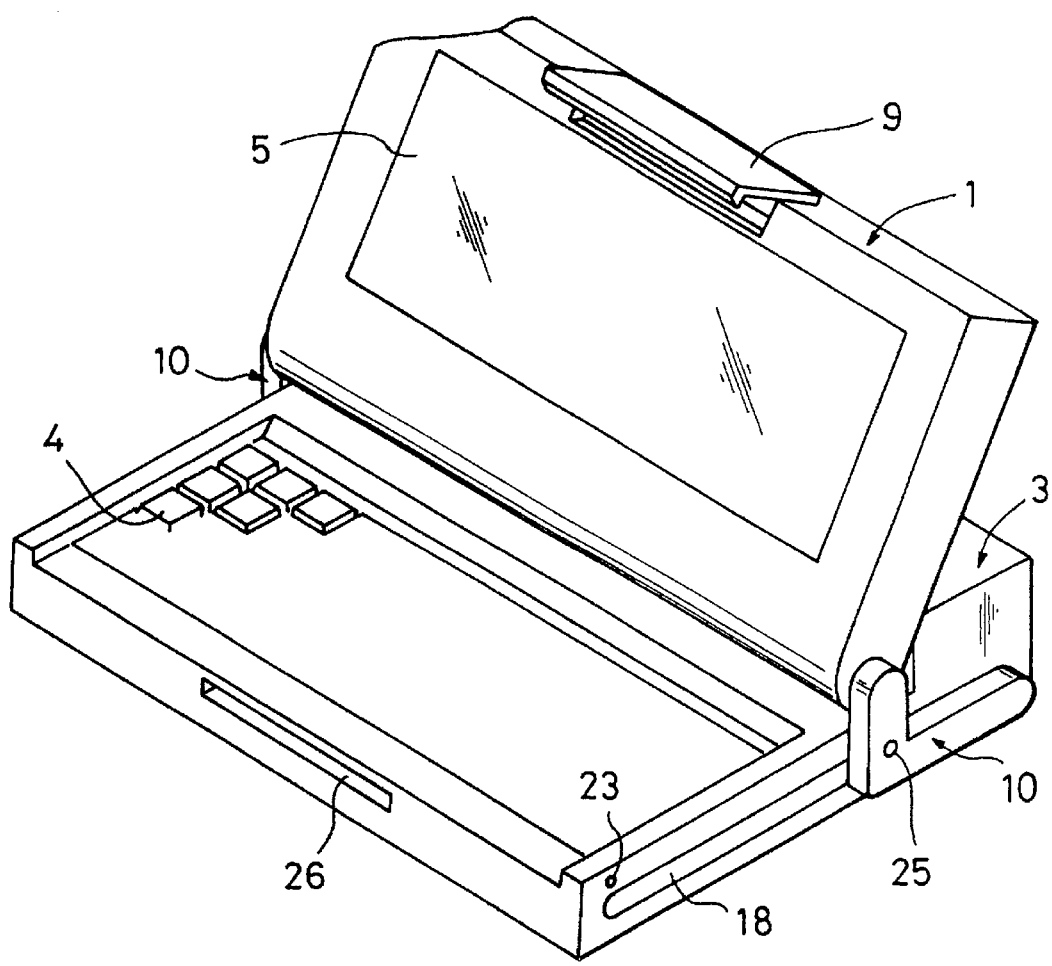
FIG. 31 is a perspective view of an appearance showing a state suitable for keyboard input of an information processing apparatus according to a third embodiment of the present invention.

FIG. 31 is a perspective view of an appearance of an information processing apparatus according to a third embodiment of the present invention. In FIG. 31, a keyboard 4 for input operation is provided at a portion closer to the operator of the upper surface of a main body 3 of the apparatus. A display unit supporting means 1 for holding an information display unit for displaying information and a touch panel 5, serving as an input means, is rotatably connected to the main body 3 of the apparatus via connecting members 10, 10. The touch panel 5 is incorporated on the front surface of the information display unit (display surface) in a superposed state. The keyboard 4 is disposed at a position lower than the surface of the main body 3 of the apparatus. In respective drawings illustrating the embodiment, the same numerals indicate the same components (or equivalent components).

Figure 32:
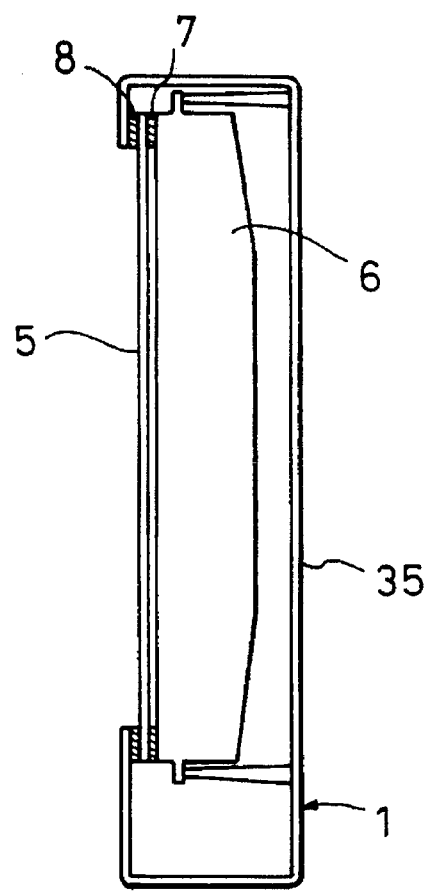
FIG. 32 is a vertical cross-sectional view showing the internal structure of a display unit supporting means shown in FIG. 31.

FIG. 32 is a vertical cross-sectional view showing the internal structure of the display unit supporting means 1. In FIG. 32, a packing 7 is disposed between a display means 6, such as a liquid crystal display or the like, and the touch panel 5 so that the gap is minimized in order to prevent deviation between a display position and a touch position due to parallax, and the touch panel 5 does not contact the front surface (display surface) of the display means 6 by a pressing force. A packing 8 is also disposed between the display unit supporting means 1 and the touch panel 5 in order to prevent an erroneous operation due to a stress applied to the touch panel 5. A plane 35 substantially parallel to the touch panel 5 is formed on a surface (back surface) opposite to the display surface (the surface at the side of the touch panel 5) of the display unit supporting means 1.

Figure 33:
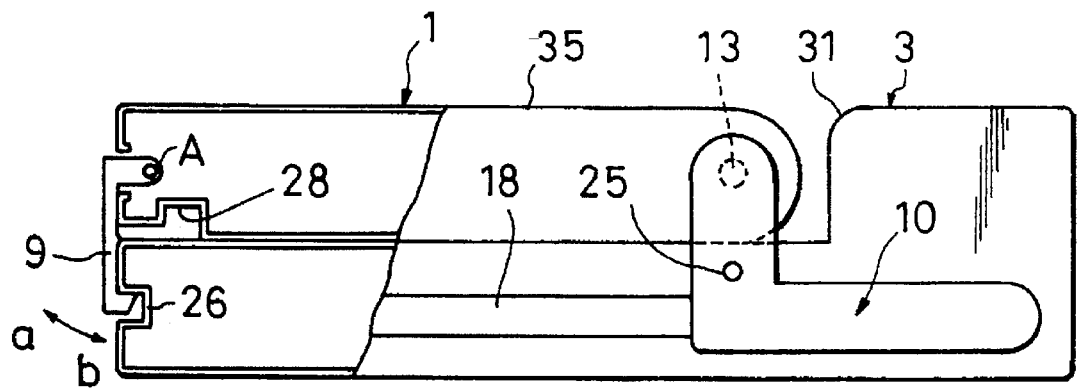
FIG. 33 is a side view showing a state wherein the display unit supporting means is closed (folded) of the information processing apparatus.
Figure 34:
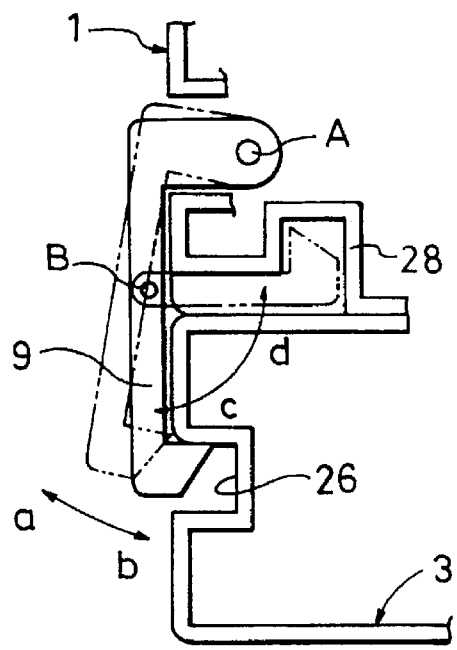
FIG. 34 is a partial vertical cross-sectional view showing the detailed structure of a hook shown in FIG. 33.
Figure 35:
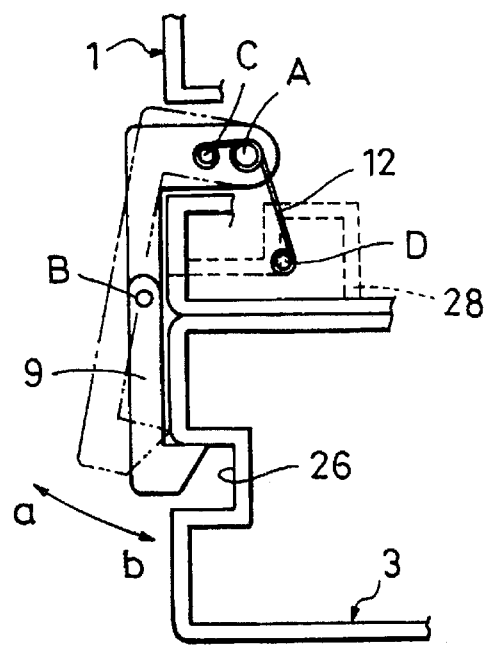
FIG. 35 is a partial vertical cross-sectional view of another position showing the detailed structure of the hook shown in FIG. 33.

FIG. 33 is a partially broken side view showing the schematic configuration of a mechanism of mounting the display unit supporting means 1 on the main body 3 of the apparatus. In FIG. 33, while the information processing apparatus is carried or accomodated, the display unit supporting means 1 is held on the main body 3 of the apparatus by a hook 9 and connecting members 10. FIGS. 34 and 35 are partial vertical cross-sectional views showing the detailed structure of the hook 9. In FIG. 34 and 35, the hook 9 is rotatable around a fulcrum A provided on the display unit supporting means 1 in the directions of arrows a and b, and is foldable around point B provided in an intermediate portion of the hook 9 in the directions of arrows c and d. The hook 9 is always driven in the direction of arrow b by a spring 12 both ends of which are fixed to point C on the hook 9 and point D in the display unit supporting means 1. A recess 27 engageable with the hook 9 is provided on the front side of the main body 3 of the apparatus. A recess 28 for accommodating the hook 9 is provided in the display unit supporting means 1.

Figure 36:
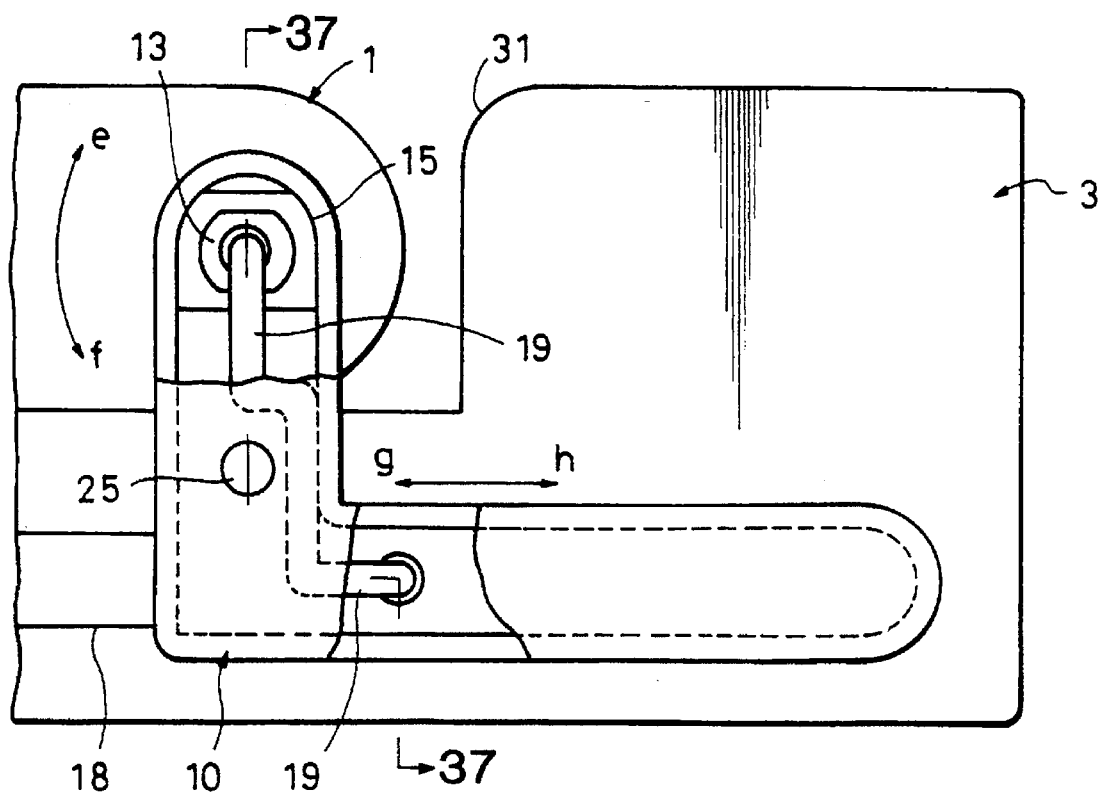
FIG. 36 is a partial side view showing the detailed structure of a connecting member shown in FIGS. 31 and 33.
Figures 37, 38:
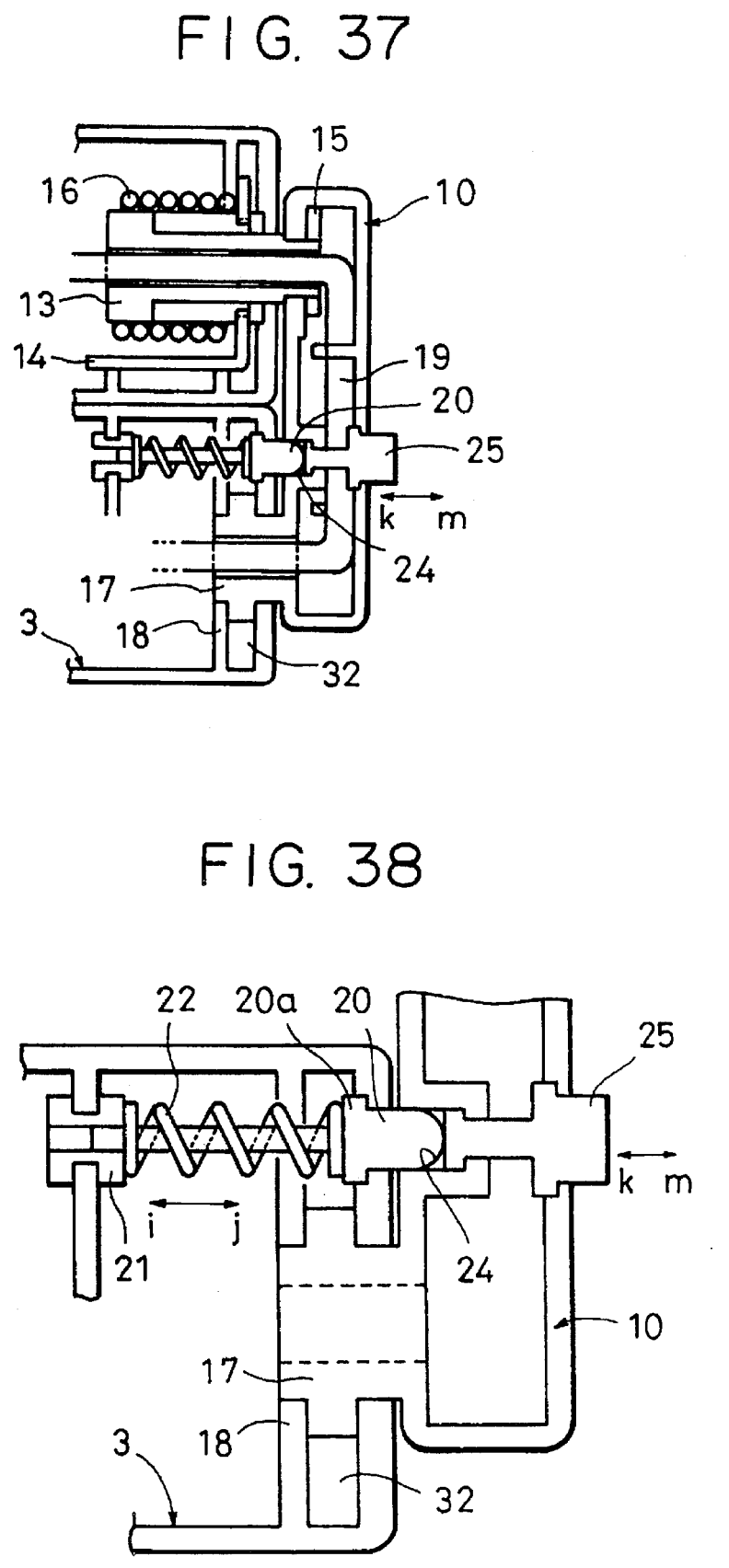

FIG. 36 is a partial side view showing the structure of the connecting members 10. FIG. 37 is a cross-sectional view taken along line 37—37 shown in FIG. 36. The connecting members 10 are provided at the right and left sides of the information processing apparatus. The two members have substantially the same structure. The connecting members 10 connect lower-end portions of the sides (as shown in FIG. 31, lower portions in a state of opening (standing) the display unit supporting means 1) of the display unit supporting means 1 and the sides of the main body 3 of the apparatus, and are rotatably connected to the respective portions. In FIGS. 36 and 37, connecting shafts 13 for the connecting members 10 are provided at right and left lower-end portions of the display unit supporting means 1. Each of the connecting shafts 13 is supported on the display unit supporting means 1 by a supporting member 14, and is fixed within the connecting member 10 by a fixing member 15. According to such a connecting structure, the display unit supporting means 1 is rotatable relative to the connecting members 10 in the directions of arrows e and f. A spring 16 which is the same as the torsion coil spring 52 shown in FIG. 16, that is, a damping mechanism utilizing a tightening torque and a releasing torque, is incorporated in a rotating portion comprising the connecting shaft 13.

A slider 17 is formed at a lower portion of the connecting member 10, and upper and lower projections of the slider 17 are fitted in a groove portion 32 formed between the outer case of the main body 3 of the apparatus and a guide 18. The guide 18 is formed in back-and-forth directions, and the connecting member 10 is supported so as to be movable along the guide 18 only in the direction of arrows g and h relative to the main body 3 of the apparatus. As shown in FIGS. 36 and 37, a signal cord 19 for electrically connecting the display means 6 and the main body 3 of the apparatus is guided within the main body 3 of the apparatus through the connecting shaft 13 and the connecting member 10 so as not to produce torsion even if the display unit supporting means 1 rotates.

FIG. 38 is a partial cross-sectional view showing the structure of a holding mechanism for holding the connecting member 10 relative to the main body 3 of the apparatus. Holding mechanisms having the structure shown in FIG. 38 are provided at each of the four portions, i.e., two at right and left sides of the main body 3 of the apparatus. In FIG. 38, a holding pin 20 is supported by a guide provided in the main body 3 of the apparatus, and is always driven in the direction of arrow j by a spring 22. A step portion 20a for regulating the height of projection from the side of the main body 3 of the apparatus is formed at the holding pin 20. Holding mechanisms having the structure shown in FIG. 38 are provided at two portions, i.e., front and rear portions of each of the both sides of the main body 3 of the apparatus. Holding pins at the rear portions are indicated by reference numeral 20 (see FIGS. 40, 44 and 45), and holding pins at the front portion are indicated by reference numeral 23 (see FIGS. 31, 40 and 44). These holding pins are provided at positions shown in FIGS. 31, 40, 44 and 45.

As shown in FIGS. 37 and 38, a recess 24 engageable with the holding pins 20 and 23 is provided in each of the connecting members 10, and a button 25 movable in the directions of arrows k and m is provided in the recess 24. The button 25 is provided for the purpose of releasing engagement between the connecting member 10 and the main body 3 of the apparatus by pressing the holding pin 25, and can be operated from the side of the apparatus by the user.

Figure 39:
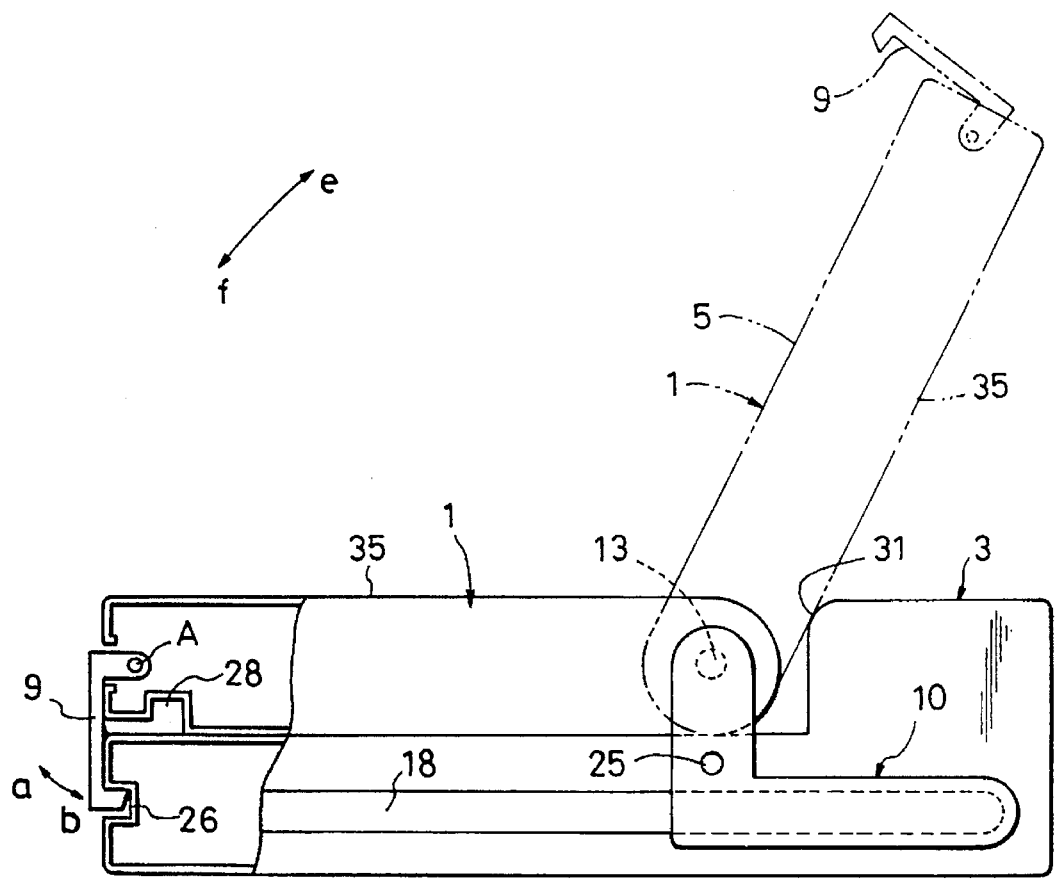
FIG. 39 is a side view showing a state of rotating the display unit supporting means from a closed position to an opened position.
Figure 40:
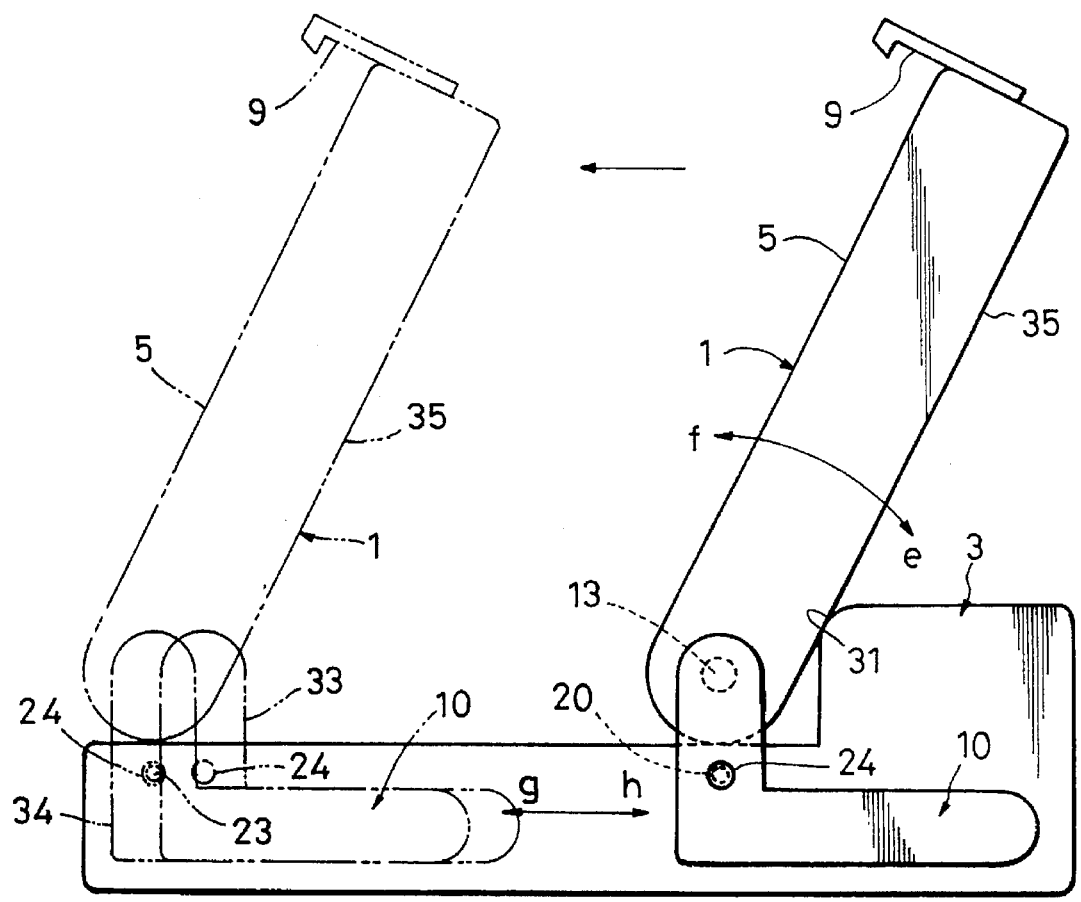
FIG. 40 is a side view showing a state of moving the display unit supporting means and the connecting member to a front portion of the main body of the apparatus.
Figure 41:
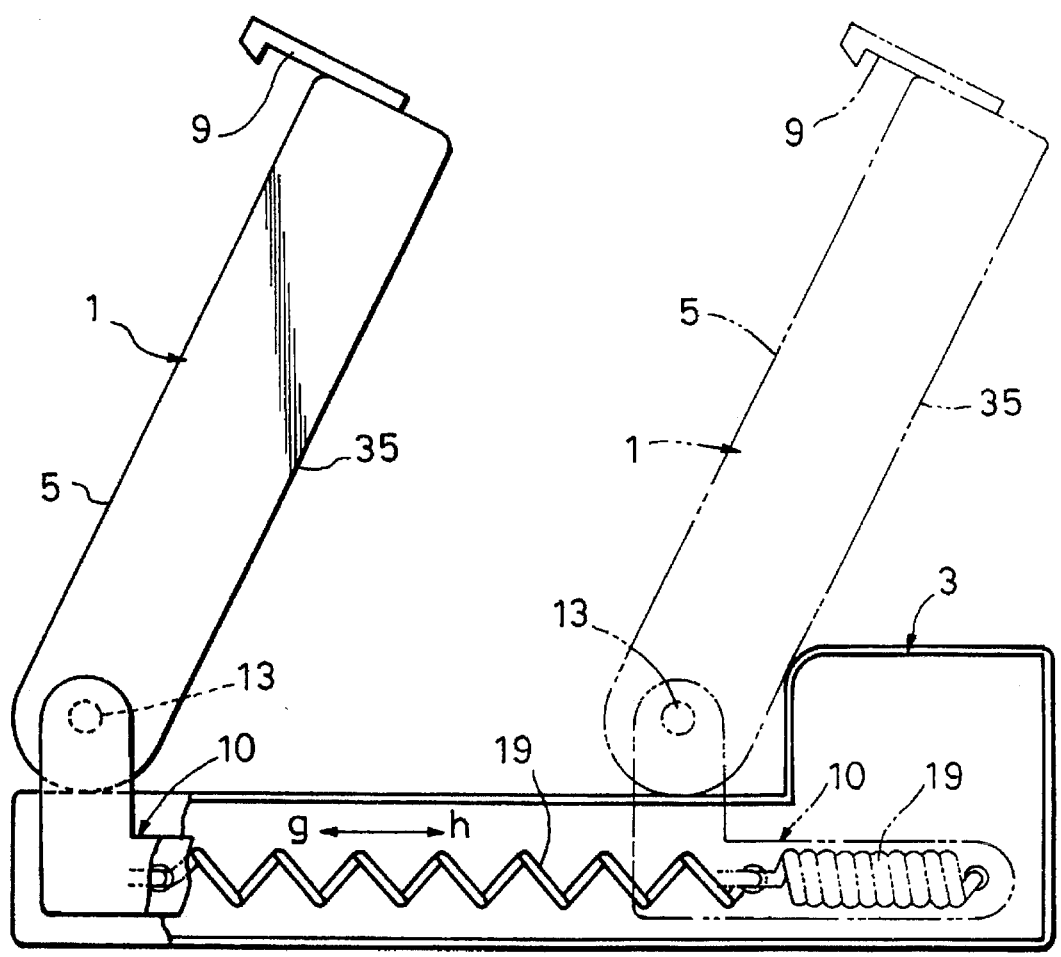
FIG. 41 is a side view showing a state of expansion/contraction of an electrical signal cord when the display unit supporting means and the connecting member are moved in back-and-forth directions relative to the main body of the apparatus.
Figure 42:
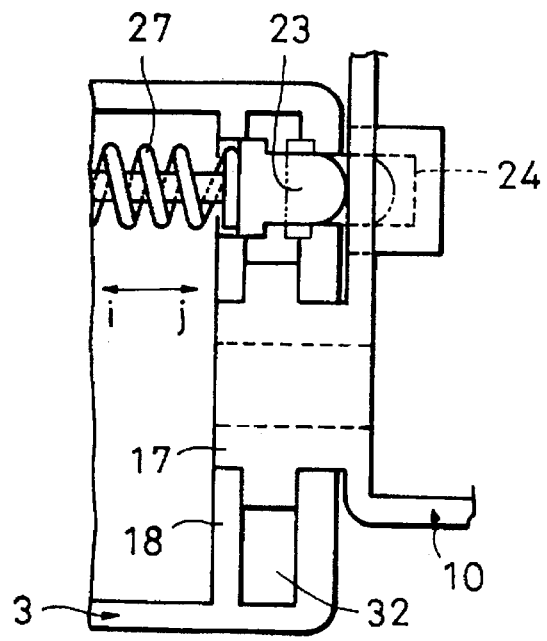
FIG. 42 is a cross-sectional view showing a state immediately before pin engagement of a holding mechanism and a guide mechanism provided at the front side for holding the connecting member relative to the main body of the apparatus and a guide mechanism.
Figure 43:
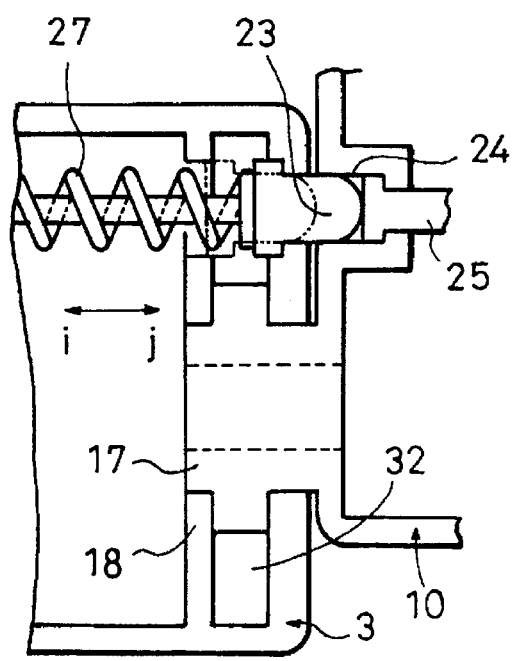
FIG. 43 is a cross-sectional view showing an engaged holding state for holding the holding mechanism for holding the connecting member relative to the main body of the apparatus, and the guide mechanism.
Figure 44:
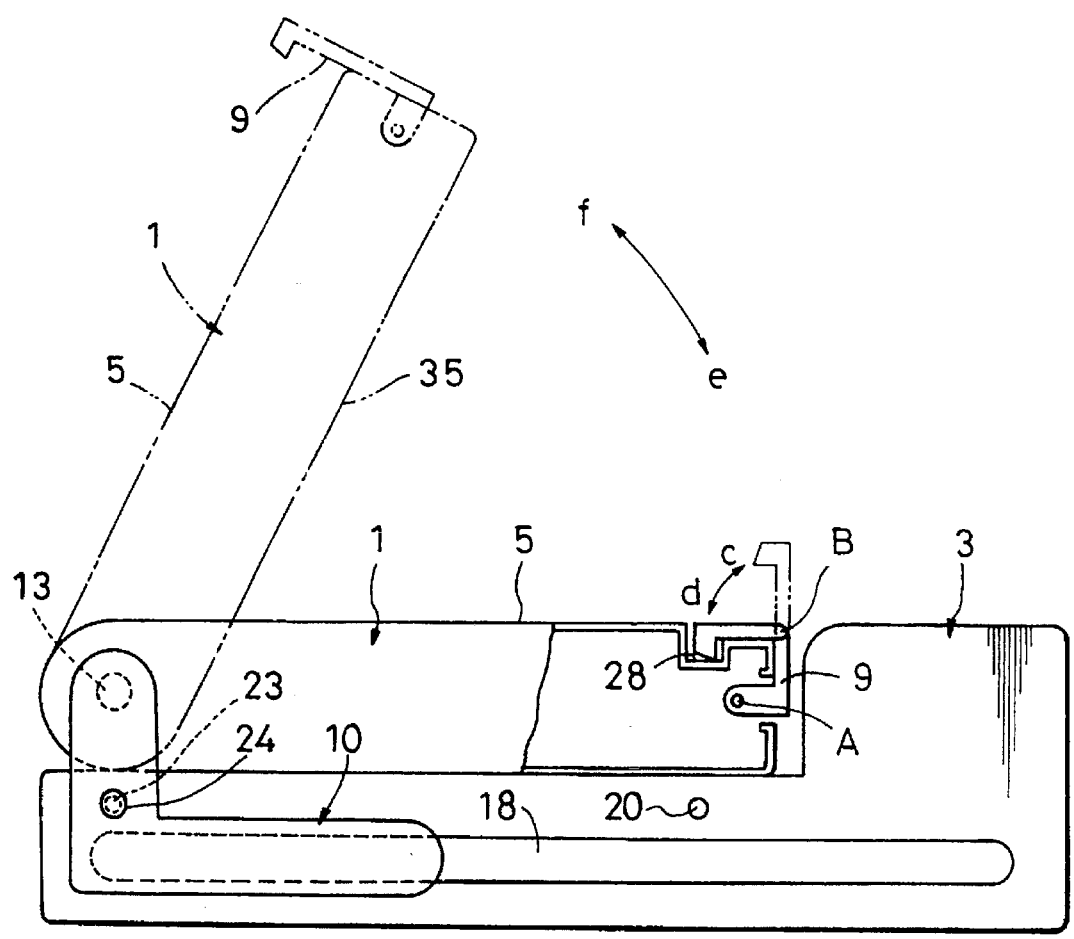
FIG. 44 is a side view showing a state of rotating the display unit supporting means to a substantially horizontal position suitable for touch panel input.
Figure 45:
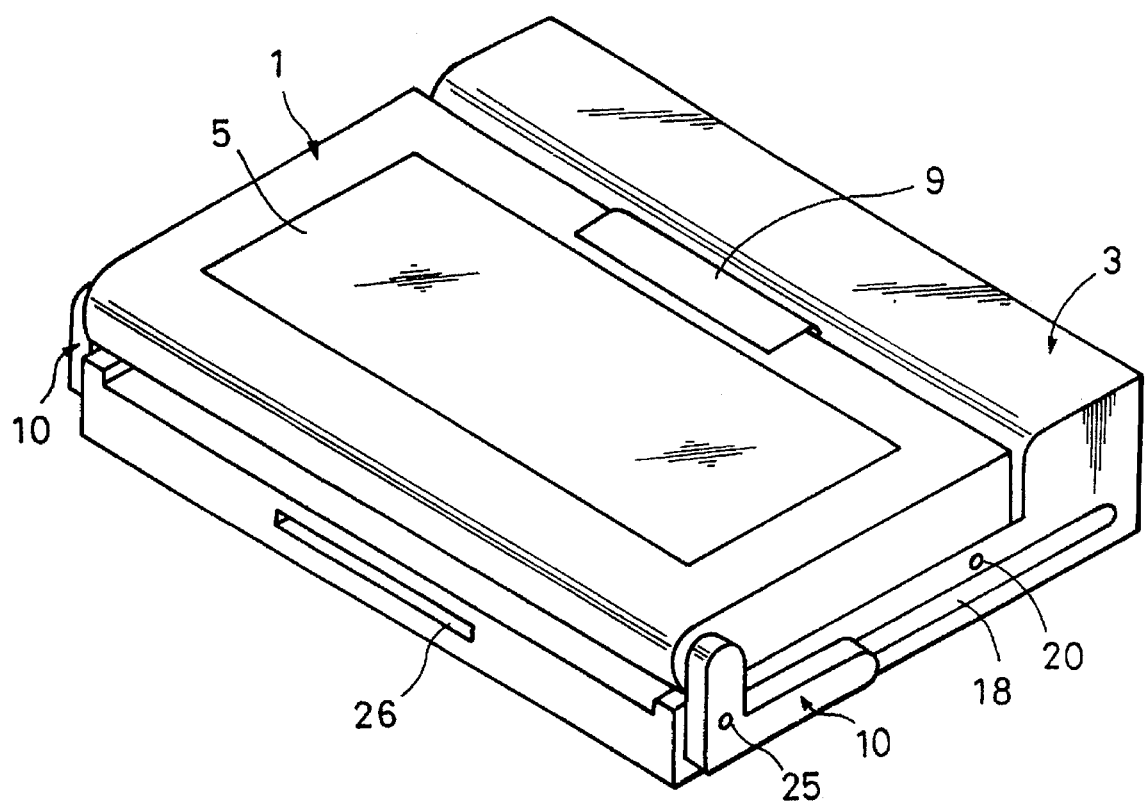
FIG. 45 is a perspective view of an appearance showing a state suitable for touch panel input of the information processing apparatus of the third embodiment.

FIG. 39 is a side view showing a state of rotating the display unit supporting means 1 between a folded position (indicated by solid lines) and an upright position (indicated by two-dot chain lines). FIG. 40 is a side view showing a state of forwardly moving the connecting members 10 in a state of standing the display unit supporting means 1. FIG. 41 is a side view showing a state of wiring the signal cord 19 when the display unit supporting means 1 and the connecting members 10 are moved back and forth. FIG. 42 is a cross-sectional view showing a state wherein the holding pin 23 at the front portion is depressed by the connecting member 10 which has moved to the front side. FIG. 43 is a cross-sectional view showing a state wherein the holding pin 23 at the front portion enters (engages) the recess 24 of the connecting member 10 by a restoring force of the spring 27. FIG. 44 is a side view showing a state of rotating the display unit supporting means 1 which has been moved to the front side from an upright position to a touch panel input position (indicated by solid lines) which is substantially horizontal. FIG. 45 is a perspective view showing a state suitable for touch panel input wherein the touch panel 5 is superposed on the main body 3 of the apparatus in a face-up posture.

Next, an explanation will be provided of the operation when the information processing apparatus is used with reference to FIGS. 39–45. In FIG. 39, the hook 9 is first detached from the recess 26 in the front portion of the main body 3 of the apparatus by rotating the hook 9 in the direction of arrow "a" from a state of accommodating (folding) the display unit supporting means 1 indicated by solid lines. Subsequently, the display unit supporting means 1 is rotated around the connecting shaft 13 for the connecting members 10 in the direction of arrow e so as assume an opened position (upright position) where a back surface 35 of the display unit supporting means 1 contacts an inclined portion 31 of the main body 3 of the apparatus. This opened position corresponds to a holding position where the apparatus is used while the user watches the image display unit (display surface) of the display unit supporting means 1. If the button 25 is depressed in the direction of arrow k shown in FIG. 38, the holding pin 20 moves in the direction of arrow i and is detached from the recess 24, whereby the connecting member 10 becomes movable relative to the main body 3 of the apparatus in the direction of arrows g and h.

Subsequently, as shown in FIG. 40, the display unit supporting means 1 and the connecting members 10 are forwardly moved relative to the main body 3 of the apparatus. As shown in FIG. 41, the signal cord 19 for electrically connecting the display unit 6 and the main body 3 of the apparatus is accommodated in the main body 3 of the apparatus in a curled state, and expands and contracts in accordance with the back-and-forth movement of the display unit supporting means 1 and the connecting members 10. If the connecting members 10 forwardly (in the direction of arrow g) move and contact the holding pins 23 at the front portions (reach a position indicated by two-dot chain lines 33 shown in FIG. 40), the holding pins 23 at the front portions are depressed by the connecting members 10 in the direction of arrow i, as shown in FIG. 42. If the connecting members 10 further forwardly move, and the recesses 24 of the connecting members 10 reach the positions of the holding pins 23 at the front portions (reach a position indicated by two-dot chain lines in FIG. 40), the holding pins 23 move in the direction of arrow j by a restoring force of the springs 27, and enter (engage) the recesses 24 of the connecting members 10, as shown in FIG. 43. Thus, the display unit supporting means 1 and the connecting members 10 are held at a position indicated by solid lines in FIG. 41 (a position indicated by two-dot chain lines 34 in FIG. 40) relative to the main body 3 of the apparatus.

Subsequently, as shown in FIG. 44, if the display unit supporting means 1 is rotated around the connecting shaft 13 for the connecting members 10 in the direction of arrow e, the display unit supporting means 1 is supported in a state wherein the back surface 35 of the display unit supporting means 1 is superposed on the main body 3 of the apparatus. That is, as shown in FIG. 44 by solid lines, the display unit supporting means 1 is supported while being superposed on the main body 3 of the apparatus in a substantially horizontal posture wherein the image display unit (display surface) including the touch panel 5 is in a face-up state. At that time, as shown in FIG. 31, since the keyboard 4 is disposed lower than the surface of the main body 3 of the apparatus, the back surface 35 of the display unit supporting means 1 does not touch the keyboard 4. As shown in FIG. 44 by solid lines, by rotating a portion of the hook 9 close to the front end thereof around point B in the direction of arrow d, the hook 9 can be accommodated within a recess 28 provided in the display unit supporting means 1.

According to the above-described embodiment, the connecting members 10 are provided between the display unit supporting means 1 and the main body 3 of the apparatus, the display unit supporting means 1 is connected to the connecting members 10 in a rotatable state, and the connecting members 10 are supported so as to be movable relative to the main body 3 of the apparatus back and forth. Hence, as shown in FIG. 45, it becomes possible to place the display unit supporting means 1 while being substantially horizontally superposed on the main body 3 of the apparatus in a state wherein the display surface (image display unit) including the touch panel 5 is in a face-up posture. Accordingly, the touch panel 5 can be used as an input means in a state wherein the display unit supporting means 1 is stably supported in a substantially horizontal posture on the main body 3 of the apparatus. Hence, deflection or movement will not occur in the display unit supporting means 1 even if the user depresses the touch panel 5 from above, whereby it is possible to increase operability and operational feeling when touch panel input is performed, and to reduce burden on arms.

The display unit supporting means 1 can be easily moved between a position for use shown in FIG. 31 where keyboard input is performed while watching the display surface (image display unit), and a position for use shown in FIG. 45 where touch panel input is performed while watching the display surface. Hence, it becomes possible to provide an optimum environment for use for both when the keyboard 4 is used and when the touch panel 5 is used. Although, in the above-described embodiment, the holding mechanisms for holding the connecting members 10 relative to the main body 3 of the apparatus are provided at two portions at the right and left sides, respectively, the holding mechanisms may be provided at at least three portions at the both sides, respectively.

As is apparent from the foregoing explanation, according to the present embodiment, an information processing apparatus comprising display unit supporting means for holding an information display unit for displaying information and a touch panel for inputting information is configured such that the display unit supporting means and a main body of the apparatus are connected by connecting members which are rotatably connected to lower-end portions of the display unit supporting means and are connected to the main body of the apparatus so as to be slidable in the back-and-forth directions, whereby the display unit supporting means can be substantially horizontally placed on the main body of the apparatus with the touch panel in a face-up state. Hence, it is possible to provide an information processing apparatus which can prevent displacement (movement) of display unit supporting means when a touch panel is used, to improve operability and operational feeling when an input operation is performed from the touch panel, and to reduce fatigue of arms during operation.

Fourth Embodiment

Figure 46:
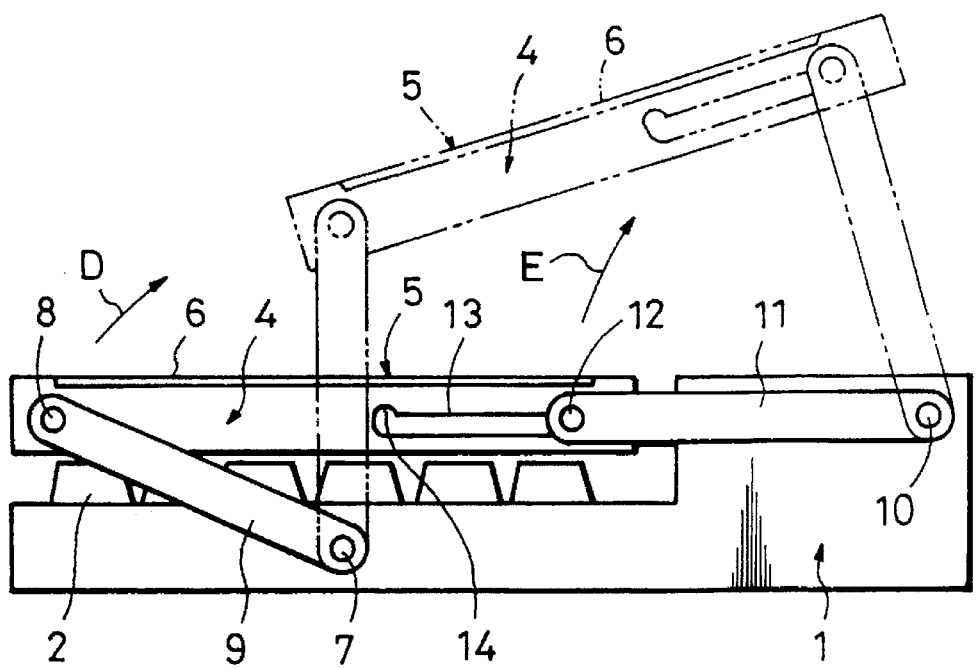
FIG. 46 is a side view showing a state of use and an accomodated state of a work station according to a fourth embodiment of the present invention.
Figure 47:
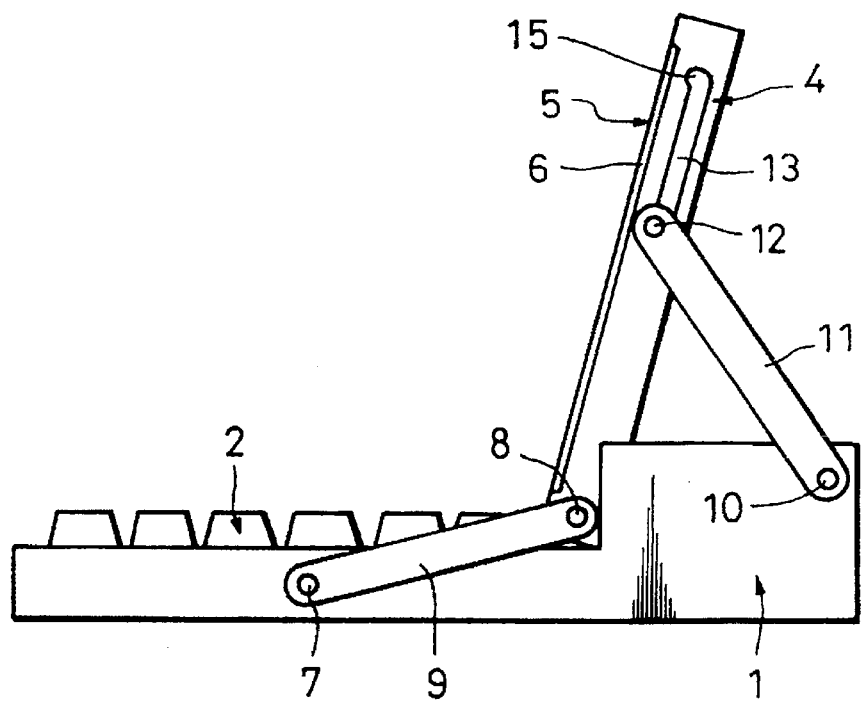
FIG. 47 is a side view showing a state of standing a display in the work station shown in FIG. 46.

A fourth embodiment of the present invention will now be explained with reference to the drawings. FIG. 46 is a side view showing a state of accommodating a display and a state of standing the display in a work station according to the fourth embodiment. FIG. 47 is a side view showing a state of standing the display of the work station shown in FIG. 46. In FIGS. 46 and 47, a keyboard 2 is provided at a portion closer to the user of a main body 1 of the apparatus, and flat display 4 is accommodated on the operational surface of the keyboard 2 with its display surface 5 in a face-up state as indicated by solid lines. A touch panel 6 is provided on the display surface 5. A supporting shaft provided at a portion below the keyboard 2 of the main body 1 of the apparatus, and supporting shaft 8 provided at a front-end portion of the display 4 are connected by a first arm 9. The arm 9 is rotatably connected to the supporting shafts 7 and 8.

A second arm 11 is rotatably connected to a supporting shaft 10 provided at a rear portion of the main body 1 of the apparatus. A shaft (or a pin) 12 provided at another end portion of the second arm 11 slidably engages in a groove 13 having a predetermined length provided at a rear portion of the display 4. If the first arm 9 is moved to a substantially vertical position indicated by two-dot chain lines by rotating it in the direction of arrow D, the second arm 11 rotates in the direction of arrow E and moves to a substantially vertical position indicated by two-dot chain lines. By such rotation of the first arm 9 and the second arm 11, the display 4 is raised to an upper position indicated by two-dot chain lines. That is, the display 4 moves from the accommodated position indicated by solid lines to the position for use (the position where the touch panel 6 is mainly used) indicated by two-dot chain lines.

An appropriate resistance is provided by a friction means (not shown) for the rotation of the first arm 9 around the supporting shaft 7, whereby the display 4 is held at the raised position (the position for use) indicated by the two-dot chain lines in a stable state. As shown in an enlarged side view of FIG. 48, notches 14 and 15 are formed at both ends of the groove 13 so that the second arm 11 is anchored in a stable state at two portions where the shaft 12 at the front end portion of the second arm 11 is fitted in the notch 14 or 15. As shown in FIG. 46, in a state of raising the display 4, the shaft 12 fits in the rear notch 15, whereby the display 4 is supported by the arm 11 in a stable state. In the present embodiment, in consideration of laptop use, when the display 4 is held at the raised position indicated by the two-not chain lines, the display 4 is inclined so that the display surface 5 is easily seen, that is, the front-end portion of the display 4 is lowered.

The first arm 9 can be further rotated to a position shown in FIG. 47. The shaft 12 at the front-end portion of the second arm 11 is connected slidably along the groove 13. Accordingly, if the front-end portion of the display 4 is moved to a rear portion of the keyboard 2 by further rotating the first arm 9 from the raised position indicated by the two-dot chain lines shown in FIG. 46, and the shaft 12 is fitted into the front notch 14 by sliding the shaft 12 along the groove 13, the display 4 is stably held in an upright state shown in FIG. 47. When accommodating the display 4, the first arm 9 may be rotated in a direction reverse to the above-described direction while forwardly pushing the display 4. Hence, it is possible to easily move the display 4 from the upright position shown in FIG. 47 or the raised position shown in FIG. 46 to the accommodated position.

In the work station having the above-described configuration, when carrying the work station, the display 4 assumes the accommodated state indicated by the solid lines in FIG. 46. Even in this accommodated state, it is possible to see the display surface of the display 4, and to operate the touch panel 6. If an input operation from the keyboard 2 is needed, the keyboard 2 can be operated by raising the display 4 and holding it at the position indicated by the two-dot chain lines in FIG. 46. If a desk is absent when, for example, the work station is carried, the work station is used on the lap of the user. In that case, if the display 4 is raised to the position indicated by the two-dot chain lines in FIG. 46, the display surface 5 can be easily seen because of the view angle, since the display surface 5 is inclined at a predetermined angle as described above.

Figure 50:
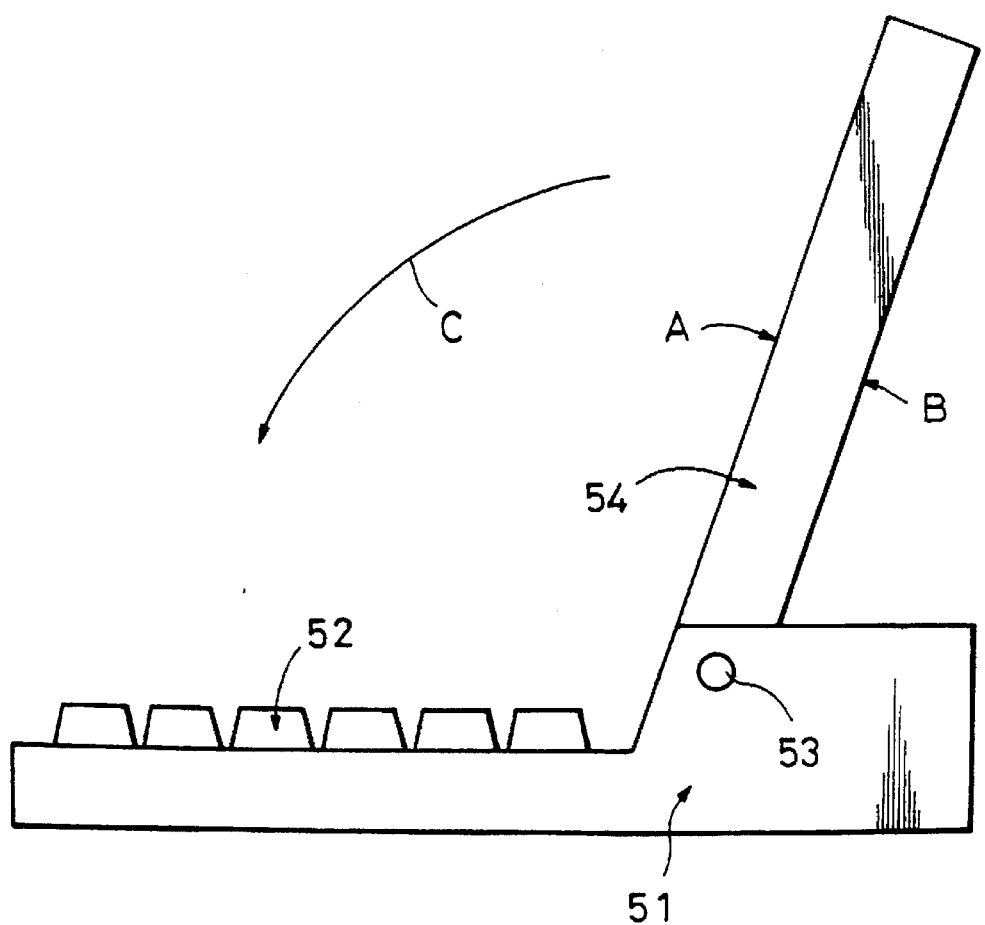
FIG. 50 is a side view showing the configuration of a conventional work station.

If it is desired to regularly operate the work station on a desk, the display 4 may be held in a state of standing at a position behind the keyboard 2 by rotating the first arm 9 to the back side, as shown in FIG. 47. That is, in this case, the display 4 is held at the same position as in the conventional approach shown in FIG. 50. In the state of standing the display as shown in FIG. 47, since the shaft 12 at the front-end portion of the second arm 11 engages the notch 14 by sliding it in the groove 13 as described above, it it possible to stably support the display 4 by the second arm 11, and therefore to remove movement of the display 4 when the touch panel 6 is operated. The display 4 may be accommodated by forwardly pushing the display 4.

Figure 48:
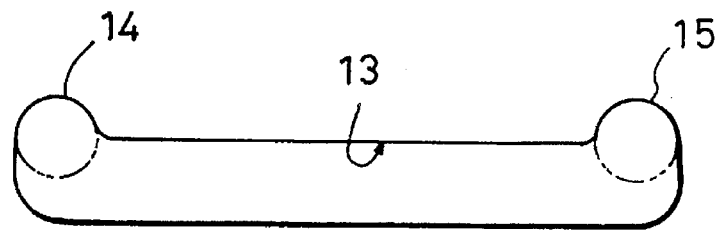
FIG. 48 is an enlarged side view of a connecting groove provided in the display shown in FIG. 46.
Figure 49:
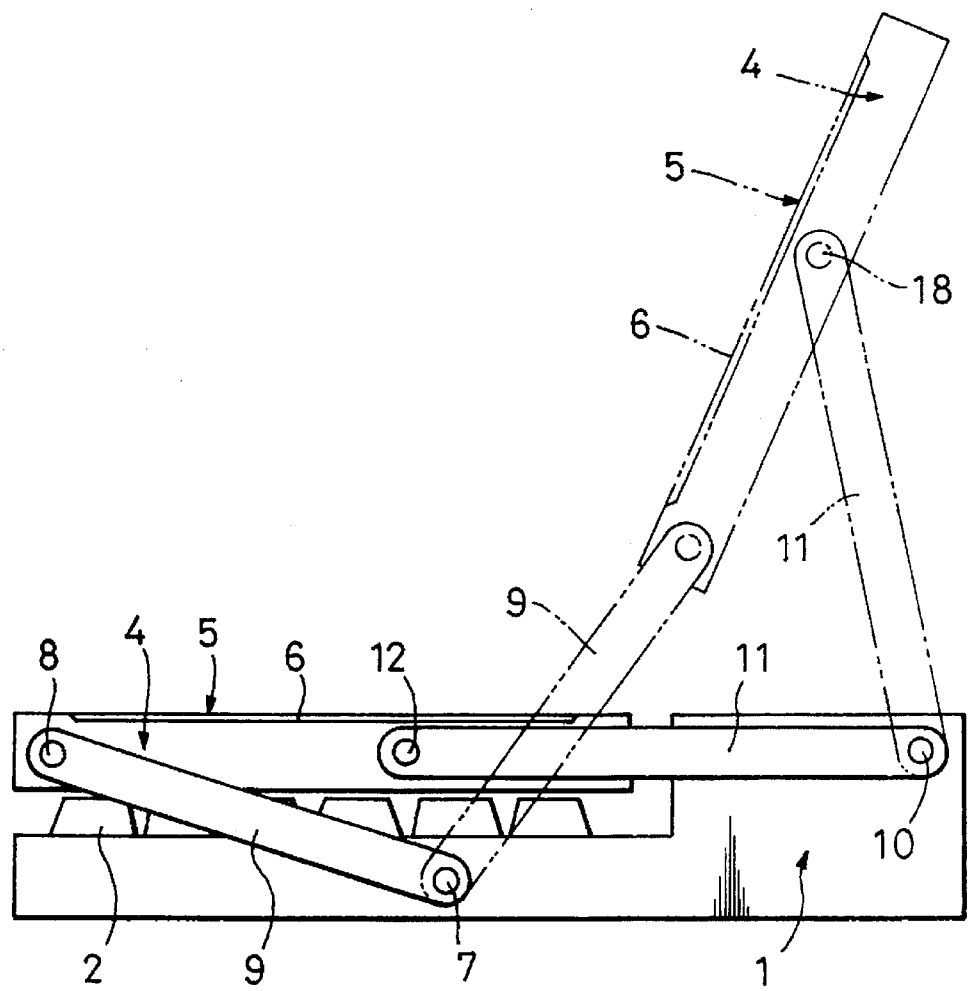
FIG. 49 is a side view showing an accomodated state and a standing state of a display of a work station according a modification of the fourth embodiment.

FIG. 49 is a side view showing a state of accommodating a display and a state of raising the display of a work station according to a modification of the fourth embodiment. In the present embodiment, the lenghs of the first arm 9 and the second arm 11 in the fourth embodiment shown in FIGS. 46–48 are increased, a supporting shaft 18 is provided for the display 4 in place of the groove 13, and the front-end portion of the second arm 11 is rotatably connected to the supported shaft 18. The present embodiment differs from the fourth embodiment in the above-described portions, but has substantially the same configuration as the fourth embodiment in other portions. Hence, the corresponding components are indicated by the same reference numerals, and further explanation thereof will be omitted.

Also in the embodiment shown in FIG. 49, the display 4 can be raised to a position indicated by two-dot chain lines shown in FIG. 49 while rotating the first arm 9 and the second arm 11. In the present embodiment, in a state of raising the display 4, the display 4 is held at an upright state as shown in FIG. 49 at a position sufficiently separated from the keyboard 2. In the present embodiment, since the display 4 is held at a position sufficiently separated from the keyboard 2, it is possible to move securely prevent a misoperation of erroneously touching the keyboard 2 with a hand while operating the touch panel 6.

According to the above-described embodiments, since the display 4 accommodated with the display surface 5 in a faceup state is upwardly raised and held above the keyboard 2 by the first arm 9 and the second arm 11, it becomes possible to smoothly move the display 4 between the state of use wherein the display 4 is accommodated and the state of use wherein the keyboard 2 is used by a single operation. Furthermore, the display 4 may be used in a state of standing behind the keyboard 2. In that case, the display 4 can be supported in a stable state by the arms 9 and 11. Hence, it is possible to obtain an excellent operational feeling by removing a movement when an external force is applied to the display 4 while, for example, the touch panel 6 is operated.

As is apparent from the foregoing explanation, according to the above-described embodiments, a work station, wherein a display is accommodated on an operational surface of a keyboard with a display surface of the display in a face-up state, includes a first arm for moving a front-end portion of the display above the operational surface of the keyboard, and a second arm for upwardly moving a rear-end portion of the display. Hence, it is possible to provide a work station which can provide a state such that a keyboard and a touch panel on a display can be easily simultaneously used, and a state such that a display surface can be easily seen by standing the display behind the keyboard by a simple operation. In addition, the work station is also configured such that the front-end portion of the display is held at a position behind the operational surface of the keyboard by further rotating the first arm, and the display is supported at an upright position by the second arm. Hence, it is possible to provide a work station which can provide a state such that a keyboard and a touch panel on a display can be easily simultaneously used, and a state such that a display surface can be easily seen by standing the display behind the keyboard by a simple operation, as in the conventional approach.

What is claimed is:

1. An information processing apparatus support system, comprising:

display unit supporting means for an information display unit for displaying information, and a touch panel for entering information, said display unit supporting means having a frame permanently fixed to said display unit supporting means;

a keyboard unit for entering information; and a connecting arm for connecting said display unit supporting means and said keyboard unit, said connecting arm being pivotally connected at one end thereof to the lower end of said display unit supporting means and pivotally connected at the other end to a fixed location on said keyboard unit;

the length of said connecting arm and the location of its pivot connection to said keyboard unit being such that said arm may swing about said pivot connection from a first position, where said frame is superimposed on said keyboard unit with said touch panel facing toward said keyboard unit, to a second position, where said frame is superimposed on said keyboard unit, with said touch panel facing away from said keyboard unit, and such that when said connecting arm is in the first position, the frame may pivot about said one end of said connecting arm to expose said touch panel and said keyboard unit.

2. An information processing apparatus support system according to claim 1, wherein said connecting arm can be held at at least two positions relative to said keyboard unit.

3. An information processing apparatus support system according to claim 1, wherein the information display unit is overlaid by the touch panel.

4. An information processing apparatus support system according to claim 1, wherein the information display unit is either facing said keyboard unit, or facing away from said keyboard unit.

5. An information processing apparatus support system according to claim 1, wherein said touch panel is operable to enter coordinate information when the display unit is facing away from said keyboard unit.

6. An information processing apparatus support system according to claim 1, wherein the information display unit is attached to said keyboard unit when the information display unit is facing said keyboard unit.

7. An information processing apparatus support system according to claim 1, wherein releasable latches are provided to secure said connecting arm to said keyboard unit at each of said first and said positions of its said one end.

8. An information processing apparatus support system according to claim 7, wherein said latches comprise at least one slot in said connecting arm and holding hooks in said keyboard unit.

9. An information processing apparatus support system according to claim 8, wherein said holding hooks are spring biased out from said keyboard unit toward said connecting arm.

10. An information processing apparatus support system comprising:

a main body in which a keyboard unit for entering information is arranged at a front portion;

a display unit permanently fixed in a frame having an information display for displaying information, and a touch panel for entering information; and a display unit supporting arm pivotally connected at one end thereof to said frame near the lower end of said display unit supporting means and pivotally connected at the other end to a fixed location on said keyboard unit;

the length of said supporting arm and the location of its pivot connection to said keyboard unit being such that said arm may swing about said pivot connection from a first position, where said frame is superimposed on said keyboard unit with said touch panel facing toward said keyboard unit, to a second position, where said frame is superimposed on said keyboard unit, with said touch panel facing away from said keyboard unit, and such that when said supporting arm is in the first position, the frame may pivot about said one end of said connecting arm to expose said touch panel and said keyboard unit.

11. An information processing apparatus support system according to claim 10, wherein the information display unit faces the keyboard unit.

12. An information processing apparatus support system according to claim 10, wherein the touch panel is operable to enter coordinate information when the display unit faces away from the keyboard unit.

13. An information processing apparatus support system according to claim 10, wherein the information display unit is attached to the keyboard unit when the information display unit faces the keyboard unit.

* * * * *

UNITED STATES PATENT AND TRADEMARK OFFICE
CERTIFICATE OF CORRECTION

PATENT NO : 5,644,469

DATED : July 1, 1997

INVENTOR(S) : YASUSHI SHIOYA ET AL

It is certified that error appears in the above-identified patent and that said Letters Patent is hereby corrected as shown below

COLUMN 1

Line 24, "of the display unit is integrally connected to the main body" should be deleted.

Line 50, "provides" should be --providers--

Line 59, "adapted" should read --adopted--.

COLUMN 7

Line 20, "according" should read --according to--.

COLUMN 12

Line 3, "rotable" should read --rotatable--

COLUMN 19

Line 44, "two-not" should read --two-dot--.

UNITED STATES PATENT AND TRADEMARK OFFICE
CERTIFICATE OF CORRECTION

PATENT NO : 5,644,469

DATED : July 1, 1997

INVENTOR(S) : YASUSHI SHIOYA ET AL

It is certified that error appears in the above-identified patent and that said Letters Patent is hereby corrected as shown below

COLUMN 20

Line 19, "it it" should read --it is--.

Line 46, "move" should read --more--.

Signed and Sealed this

Third Day of February, 1998

BRUCE LEHMAN

*Attest:*

*Attesting Officer*      *Commissioner of Patents and Trademarks*